US011790887B2

(12) United States Patent
Lillelund et al.

(10) Patent No.: US 11,790,887 B2
(45) Date of Patent: Oct. 17, 2023

(54) SYSTEM WITH POST-CONVERSATION REPRESENTATION, ELECTRONIC DEVICE, AND RELATED METHODS

(71) Applicant: GN Audio A/S, Ballerup (DK)

(72) Inventors: Christian Lillelund, Ballerup (DK); Anders Hvelplund, Ballerup (DK); Ali Özkil, Ballerup (DK); Florian Eyben, Gilching (DE)

( * ) Notice: Subject to any disclaimer, the term of this patent is extended or adjusted under 35 U.S.C. 154(b) by 0 days.

(21) Appl. No.: 17/531,831

(22) Filed: Nov. 22, 2021

(65) Prior Publication Data

US 2022/0172704 A1 Jun. 2, 2022

(30) Foreign Application Priority Data

Nov. 27, 2020 (DK) .............. PA202070796

(51) Int. Cl.
| | |
|---|---|
| *G10L 15/00* | (2013.01) |
| *G10L 15/02* | (2006.01) |
| *G10L 21/10* | (2013.01) |
| *G10L 15/18* | (2013.01) |
| *G10L 15/22* | (2006.01) |

(52) U.S. Cl.
CPC .............. *G10L 15/02* (2013.01); *G10L 21/10* (2013.01); *G10L 15/1815* (2013.01); *G10L 15/22* (2013.01)

(58) Field of Classification Search
CPC ......... G10L 15/07; G10L 15/20; G10L 15/22; G10L 15/26; G10L 15/30; G10L 15/02; G10L 15/08; G10L 15/16; G10L 25/30; G10L 15/063; G10L 15/1822; G10L 15/183; G10L 15/19; G10L 15/193; G06F 16/685
See application file for complete search history.

(56) References Cited

U.S. PATENT DOCUMENTS

| | | | |
|---|---|---|---|
| 9,047,871 B2 | 6/2015 | Dimitriadis et al. | |
| 10,601,995 B2 | 3/2020 | Feast | |
| 2002/0194002 A1 | 12/2002 | Petrushin | |
| 2014/0140496 A1* | 5/2014 | Ripa | H04M 3/5175 |
| | | | 379/265.06 |
| 2015/0106091 A1 | 4/2015 | Wetjen et al. | |
| 2015/0264177 A1 | 9/2015 | Feast et al. | |
| 2015/0350438 A1* | 12/2015 | Arslan | G10L 25/84 |
| | | | 379/88.01 |
| 2018/0122368 A1* | 5/2018 | Costello | G10L 21/0316 |
| 2018/0124243 A1 | 5/2018 | Zimmerman | |

FOREIGN PATENT DOCUMENTS

| | | |
|---|---|---|
| CN | 107430858 A | 12/2017 |
| CN | 111445906 A | 7/2020 |
| CN | 111986702 A | 11/2020 |
| WO | WO2014061015 | 4/2014 |

\* cited by examiner

*Primary Examiner* — Vu B Hang

(57) ABSTRACT

System, electronic device, and related methods, in particular a method of operating a system comprising an electronic device is disclosed, the method comprising obtaining one or more audio signals including a first audio signal of a first conversation; determining first speaker metric data of a first speaker based on the first audio signal, the first speaker metric data including first primary speaker metric data; detecting a termination of the first conversation; in accordance with detecting the termination of the first conversation, determining a first post-conversation representation based on the first speaker metric data; and outputting, via the interface of the electronic device, the first post-conversation representation.

16 Claims, 6 Drawing Sheets

SYSTEM WITH POST-CONVERSATION REPRESENTATION, ELECTRONIC DEVICE, AND RELATED METHODS

The present disclosure relates to speech processing and related tools and methods, and systems in particular for analysing, monitoring and/or evaluating speech of one or more speakers, for example a caller and/or an agent of a call and/or one or more participants of a telephone conversation or a meeting, such as an online meeting. Thus, a system, an electronic device, and related methods, in particular a method of operating a system comprising an electronic device is provided.

BACKGROUND

Today the interaction between people is increasingly taking place at a distance and virtually, e.g. via telephone calls, conference calls, and the like. However, it may be difficult for people speaking to each other on each side of a telephone call, to grasp emotions or sentiments of the other party by just listening to a speech.

For example, almost all support and after sales is performed over the phone between call center agents initiating and/or answering the calls and potential customers being contacted or customers contacting call center agents with various issues. Call center agents working at call centers, support center, or contact centers struggle with a job that can at time be monotonous and repetitive. This represents a negative experience for the agents, but it also leads to a worse tone performance, and in turn a lower customer satisfaction for the customers on the other end of the line and on average, longer calls. After taking calls for many hours, it can be difficult to remember that there is a human being on the other side of the call, who are longing for help to solve a problem.

SUMMARY

Accordingly, there is a need for systems, electronic devices, and methods of operating systems with improved feedback on a conversation.

A method of operating a system comprising an electronic device and/or a server device, the electronic device comprising an interface, a processor, and a memory, is disclosed, the method comprising obtaining one or more audio signals including a first audio signal of a first conversation; determining first speaker metric data of a first speaker based on the first audio signal, the first speaker metric data including first primary speaker metric data; detecting a termination of the first conversation; in accordance with detecting the termination of the first conversation, determining a first post-conversation representation based on the first speaker metric data; and outputting, e.g. from the server device to the electronic device and/or via the interface of the electronic device, the first post-conversation representation.

Further, an electronic device is disclosed, the electronic device comprising a processor, a memory, and an interface, wherein the processor is configured to perform the steps of a method according to this disclosure.

Also disclosed is an electronic device comprising a processor, a memory, and an interface, wherein the processor is configured to obtain one or more audio signals optionally including a first audio signal during a first conversation; optionally determine first speaker metric data of a first speaker based on the first audio signal, the first speaker metric data including first primary speaker metric data; optionally detect a termination of the first conversation, and in accordance with a detection of the termination of the first conversation, determine a first post-conversation representation based on the first speaker metric data; and optionally output, e.g. from the server device to the electronic device and/or via the interface, the first post-conversation representation. To output, the first post-conversation representation may comprise receiving the first post-conversation representation from a server device, and outputting, e.g. displaying, the first post-conversation representation.

Also disclosed is a system comprising a server device and an electronic device, wherein the electronic device is an electronic device according to the disclosure.

Also disclosed is a server device comprising an interface, one or more processors, and a memory, the one or more processors may be configured to perform at least parts of any the methods disclosed herein. For example, determining speaker metric data, detect a termination of a conversation, and/or determine a post-conversation representation may be performed at the server device. For example, determining post-conversation representation(s) may be performed at the server device. The post-conversation representation(s) may be transmitted to the electronic device for output, such as display, via the electronic device.

It is an advantage of the present disclosure that by providing a post-conversation representation, e.g. after a conversation, a user may see or be informed right after a conversation, such as call, or between conversations/calls, about his/her performance and/or the outcome of the conversation in relation to one or more metrics, such as the sentiment, the tone, and/or the first speaker appearance. Furthermore, the user may get a better feedback on his/her performance or on the outcome of the conversation. The user may get feedback after a conversation e.g. after a working day, between conversations (e.g. between every conversations or between a series of conversations), before a conversation, e.g. before starting a working day. The user may be a manager reviewing and/rating one or more conversations and/or training sessions of one or more other users. The post-conversation representation may provide a gamification of the users' performances. The post-conversation representation may for example increase the engagement of a user in his/her work, e.g. by being able to visualize an improvement of performances. This may be to visualize an improvement of the user's own performances and/or in view of other user's performances, e.g. users in the same company or team. The post-conversation representation may for example increase the motivation of the user and give an incentive or a motivational factor to perform better. The user may improve his/her speaking capabilities, e.g. improving consistency during the day by keeping a positive/great tone with a negative speaker, avoid poor speech performance, such as interruptions, long pauses, monotony, and/or speaking rate.

It is an advantage of the present disclosure that a speaker/user is able to monitor/evaluate a conversation, a customer, and/or a meeting, in turn allowing the speaker/user to accommodate or adapt the speaker's speech, such as tone of the speech, to improve his/her performance during a conversation and/or for future conversations. This may improve an outcome of a presentation by the speaker and/or an outcome of a conversation or meeting between the speaker and one or more other speakers. The present disclosure may also provide a development path or area for the users to improve their skills and/or competences in time, e.g. helping users to reach and/or improve their key performance indicators, KPIs. The speaker may further have an improved understanding of a conversation and/or of the other speaker, e.g. a better grasp of emotions of the other speaker. The speaker/user may for example be able to see when a customer/caller have flipped in the last conversation/call or streak of conversations/calls, e.g. changed from a negative speaker state to a positive speaker state.

Further, the present disclosure provides an improved call or conversation feedback and monitoring by displaying one or more speaker representations with increased detail level. Further, the present disclosure reduces the need for obtaining appearance data from another speaker, e.g. by requesting consent from the other speaker, which in turn may provide more efficient calls/conversations and increase the user experience of the other speaker, such as a customer or caller.

Further, the present disclosure provides more expressive and improved avatar support by heavily increasing the granularity and variety of the available speaker representations, in turn allowing improved representations and more specific feedback and/or personalization of the speaker representation. By providing improved speaker representations, the speaker/user may have an increased engagement in a conversation or a meeting, e.g. an increased engagement with regard to his/her job and/or in view of the other speaker. An advantage of having a post-conversation representation, e.g. after a conversation may be that the user of the electronic device may see or be informed right after a conversation, such as call, about his/her performance or the outcome of the conversation in relation to the sentiment, the tone, and/or the first speaker appearance. Furthermore, the user of the electronic device may get a better feedback on his/her performance or on the outcome of the conversation. The post-conversation representation may provide a gamification of the users' performances. The post-conversation representation may for example increase the engagement of a user in his/her work, e.g. by being able to visualize an improvement of performances. The first speaker representation may provide a personification of the first speaker, a portrait of the first speaker, a shape of the first speaker, a sketch of the first speaker, and/or a gamification of the first speaker.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
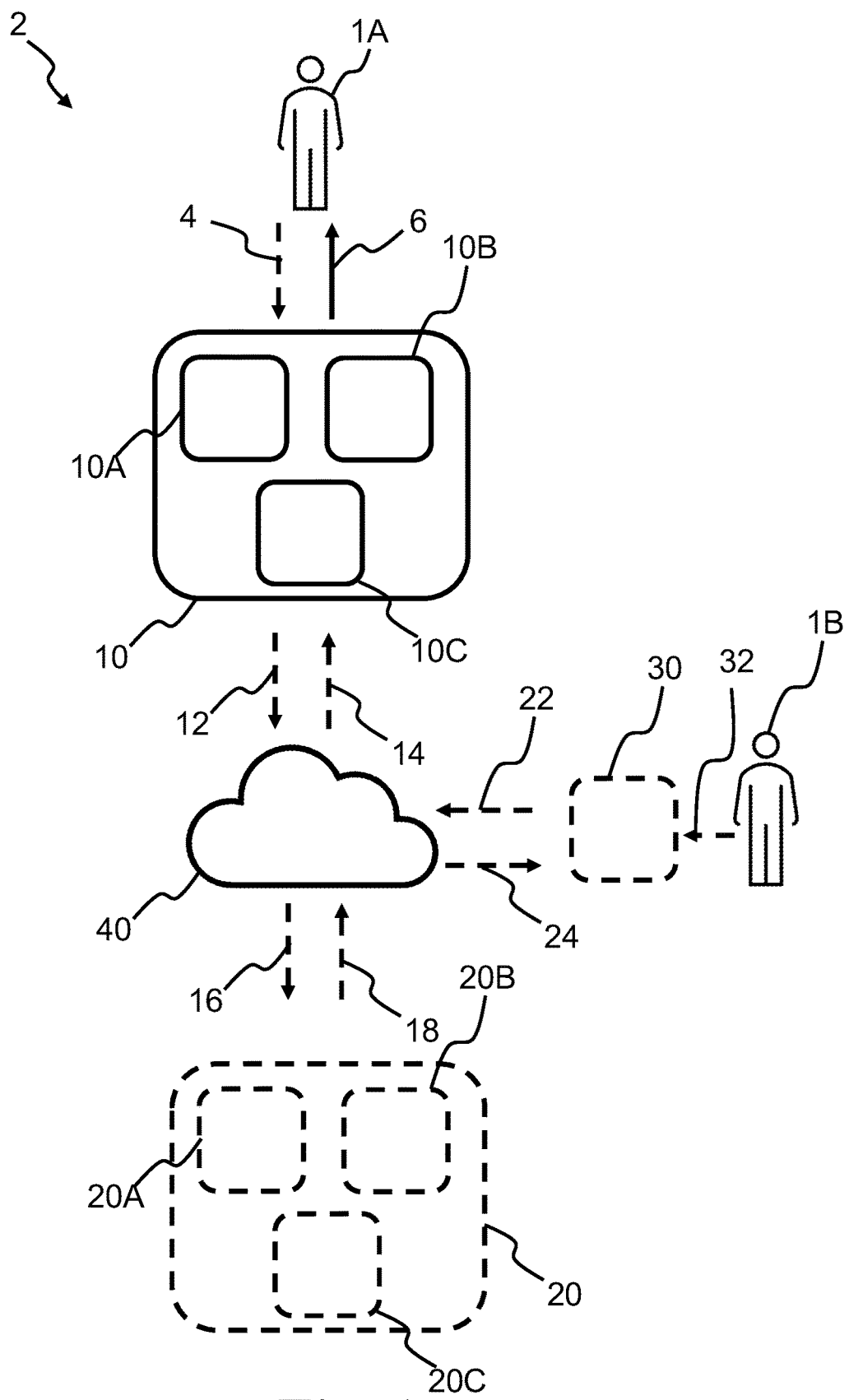
FIG. 1 schematically illustrates an exemplary system comprising a server device and an electronic device according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of operating a system comprising an electronic device is disclosed. The system may optionally comprise a server device comprising an interface, one or more processors, and a memory. The server device may be configured on a cloud, such as a cloud network. The system may be a system for monitoring, handling, and/or analysing one or more audio signals, e.g. including audio signal(s) of one or more speakers talking, e.g. as a monologue or a conversation, such as a meeting conversation, a video/telephone conference conversation, or a call, e.g. a telephone or VoIP call. The system may be a system for monitoring, handling, and/or analysing one or more audio signals, such as a conversation, e.g. between two or more people/speakers, such as a conversation in a phone call or a meeting. The system may for example comprise or act as a call center system for monitoring, handling, and/or analysing one or more audio signals, such as conversations between two or more people, e.g. a phone call between an agent of the call center system and a customer or caller. The system may be configured to use edge processing between one or more electronic devices. The system may be configured to use edge processing between one or more electronic devices. Different operations and/or steps of the method and/or the system may be performed at different devices, such as at the electronic device and/or at the server device.

The electronic device comprises an interface, a processor, and a memory. The electronic device may for example be or comprise a mobile phone, such as a smartphone, a computer, such as a laptop computer or PC, or a tablet computer. The electronic device may for example be a user device, such as a mobile phone or a computer, configured to perform a call between a user and one or more persons. The electronic device may be configured to obtain first audio input, such as first audio input from the call between the user and another person. For example, the electronic device may act as call agent device where the user may be an agent, such as an agent of a call center, such as a support call center, an after sales call center, a marketing call center, a reception call center, a sales call center, or companies where an important part of the employees' job is to have conversations with customers. The electronic device may for example be a user device, such as a mobile phone or a computer, configured to record first audio input from a first speaker, such as record the first speaker speaking or talking. The electronic device may be configured to obtain one or more audio signals, such as generate one or more audio signals, including a first audio signal. The first audio signal may be based on the first audio input.

The method comprises obtaining one or more audio signals, also denoted $AS\_i$, $i=1, 2, \ldots N$, where N is the number of speakers/audio signals, the one or more audio signals including a first audio signal of a first conversation, also denoted $AS\_1$. The first conversation may be a first voice communication. The first audio signal may be representative of first speech/voice of a first speaker of the first conversation. The first speaker may be a caller, an agent, or a first participant in a telephone conversation or a meeting, e.g. comprising the first conversation, such as where the first conversation takes place. The one or more audio signals optionally includes a second audio signal, also denoted AS_2. The second audio signal may be representative of second speech/voice of a second speaker of the first conversation. The second speaker may be a caller, an agent, an interviewer, or a second participant in a telephone conversation or a meeting, e.g. comprising the first conversation, such as where the first conversation takes place.

Obtaining one or more audio signals may comprise obtaining one or more audio inputs, such as a first audio input. In other words, the first audio signal may be based on the first audio input. The first audio signal may be obtained from a call or conversation between the user and another person, e.g. a first call or the first conversation. The first speaker may be the person speaking/talking the most during the first call and/or the first conversation. The first speaker may be the first person speaking during the first call and/or first conversation. The first speaker may be a person of interest that the user may want a representation of, such as the first speaker representation. The first audio signal may be obtained from the electronic device recording first audio input from a first speaker, such as recording the first speaker speaking or talking. Obtaining one or more audio signals may comprise generating one or more audio signals, including the first audio signal. The first audio signal may be based on the first audio input. The first audio signal may comprise a first speaker audio signal. The first audio signal may be an agent audio signal or a caller audio signal, and a second audio signal is the other.

The method comprises determining speaker metric data, also denoted SPMD. Determining speaker metric data SPMD may comprise determining first speaker metric data, also denoted SPMD_1, of a first speaker based on the first audio signal. In other words, the speaker metric data SPMD may comprise first speaker metric data SPMD_1 indicative of the first speaker and/or second speaker metric data SPMD_2 indicative of a second speaker. The speaker metric data SPMD may comprise one or more speaker metrics over time, e.g. one or more first speaker metrics over time (SPMD_1) and/or one or more second speaker metrics over time (SPMD_2). In other words, determining speaker metric data SPMD may comprise determining one or more speaker metrics SM over time, e.g. over a conversation. Determining first speaker metric data SPMD_1 may comprise determining one or more first speaker metrics SPM_1 over time, e.g. over the first conversation.

Determining first speaker metric data SPMD_1 may comprise determining first primary speaker metric data, also denoted SPMD_1_1. Determining first primary speaker metric data SPMD_1_1 may comprise determining one or more first primary speaker metrics SPM_1_1 over time, e.g. over the first conversation. In other words, the first speaker metric data SPMD_1 may comprise first primary speaker metric data SPMD_1_1. Further, the first speaker metric data may comprise or be indicative of one or more of the first primary speaker metric data SPMD_1_1 comprising one or more first primary speaker metrics, first secondary speaker metric data SPMD_1_2 comprising one or more first secondary speaker metrics, and first tertiary speaker metric data SPMD_1_3 comprising one or more first tertiary speaker metrics.

In one or more exemplary methods, the first primary speaker metric data is sentiment metric data. Determining first primary speaker metric data SPMD_1_1 may comprise determining sentiment metric data, also denoted SMD. In one or more exemplary methods, determining first primary speaker metric data SPMD_1_1 may comprise determining one or more first sentiment metrics, also denoted SM_1_$i$, $i=1, 2, \ldots, M$, where M is the number of first sentiment metrics. In other words, the sentiment metric data SMD may comprise one or more first sentiment metrics over time, e.g. over and/or during the first conversation.

A sentiment metric is indicative of a sentiment state of a speaker. The first speaker metric data may comprise one or more first sentiment parameters, e.g. comprised in the sentiment metric data SMD. The one or more first sentiment parameters may be based on the one or more first sentiment metrics. For example, the sentiment metric data SMD may be indicative of, or comprise a first sentiment parameter being a mean sentiment of a speaker over a conversation and/or a sentiment outcome of a conversation (e.g. the overall sentiment state of the speaker when the conversation is terminated). A sentiment metric may comprise one or more of a sentiment type identifier, sentiment level(s), and a confidence score.

The one or more first sentiment metrics, such as SM_1_1 and/or SM_1_2, are indicative of a first speaker state, i.e. one or more first sentiment states of the first speaker, and may be based on the first audio signal and/or the second audio signal. The one or more first sentiment metrics SM_1_$i$ may comprise one or more parameters indicative of the first speaker state.

The one or more first sentiment metrics SM_1_$i$ may include a first primary sentiment metric, also denoted SM_1_1, indicative of a primary sentiment state of a first speaker. In other words, SM_1_1 may be indicative of a primary emotion of the first speaker. SM_1_1 may be indicative of a dominating sentiment state and/or a first sentiment state in time of the first speaker. The primary sentiment state may be one of disappointed, bored, afraid, sad, negative, very negative, frustrated, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, helpful, interested, and happy. In one or more exemplary methods/systems, the primary sentiment state of the first speaker may be selected from a primary set of sentiment states.

A first sentiment metric SM_1_$i$ may comprise a first sentiment type identifier, also denoted ST_ID_1_$i$, where i is an index, and $i=1, 2, \ldots H$, where H is the number of first sentiment type identifiers. In other words, determining one or more first sentiment metrics SM_1_$i$ may comprise determining a first sentiment type identifier ST_ID_1_$i$, e.g. a first primary sentiment type identifier ST_ID_1_1 of the first primary sentiment metric SM_1_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_$i$ may respectively be selected from the same or different sets of sentiment type identifiers. For example, ST_ID_1_1 may be selected from a primary set of sentiment type identifiers and/or ST_ID_1_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the first primary sentiment metric SM_1_1 comprises a first primary sentiment type identifier ST_ID_1_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary methods, the primary set of sentiment type identifiers ST_ID_SET_1 is given by:

ST_ID_SET_1={1,2,3,4,5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:
ST_ID_SET_1={"Very negative", "Negative", "Neutral", "Positive", "Very positive"}, e.g. where "Very negative" and/or "Very positive" is optional.

In one or more exemplary methods, the primary set of sentiment type identifiers ST_ID_SET_1 is given by:

ST_ID_SET_1={1,2,3,4,5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_$i$. For example, the first primary sentiment metric SM_1_1 may comprise a first primary sentiment type identifier ST_ID_1_1 indicative of or corresponding to the primary sentiment state or the first speaker state being "positive".

A first sentiment metric SM_1_$i$ may comprise a sentiment level, also denoted SL_1_$i$, i=1, 2, ..., O, where O is the number of sentiment levels. In other words, determining SM_1_$i$ may comprise determining SL_1_$i$, e.g. determining SM_1_1 may comprise determining a first primary sentiment level SL_1_1. A sentiment level SL_1_$i$ may indicate a level of the i'th sentiment type. In other words, SL_1_$i$ may indicate a degree of the i'th sentiment type. For example, when ST_ID_1_1 corresponds to the first speaker state "positive", a first primary sentiment level SL_1_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric SM_1_$i$ may comprise a confidence score, respectively denoted SCS_1_$i$, i=1, 2, ..., P, where P is the number of confidence scores. In other words, determining SM_1_$i$ may comprise determining a first confidence score SCS_1_$i$, e.g. determining first primary sentiment metric SM_1_1 may comprise determining a first primary confidence score SCS_1_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_1=0.88 may be indicative of a probability of 88% that the determined ST_ID_1_1, e.g. being "positive", is correct.

Determining one or more first sentiment metrics indicative of a first speaker state may comprise extracting one or more speaker features from the first audio signal, e.g. wherein the one or more first sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

A linguistic feature may comprise specific sentiment related words such as positive and/or negative words. The linguistic feature may be determined based on a text transcript of the audio signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary methods, the one or more first sentiment metrics may be determined based on a machine learning, ML, model, such as an output of a ML model. The inputs to the ML model may be speaker features or the audio signal itself. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100,000 parameters to 1,000,000 parameters, e.g. 500,000 to 1,000,000 parameters. A ML model may comprise layers in the range of 5 layers to 20 layers, e.g. 10 layers to 15 layers.

Example of known ML models may be: "www.researchgate.net/publication/222431291_Emotional_speech_recognition_Resources_features_and_methods", "https://mediatum.ub.tum.de/doc/1523509/1523509.pdf", and "https://www.researchgate.net/publication/319565810_End-to-end_learning_for_dimensional_emotion_recognition_from_physiological_signals".

For example, a sentiment metric may be derived from a speaker intonation metric, also denoted S, which may be a sum of the normalised variance of fundamental frequency F0/pitch (such as range adapted from 0 to 1 by multiplication with a factor determined on the audio input, such as training audio input, as the inverse of the range of F0 variance of the training data of the ML model). For example, a sentiment metric may be derived from a speaker intonation metric S, which may be the normalised (to range 0-1) variance of the signal intensity. To determine the sentiment "aroused" and the sentiment "non-aroused", for example, a threshold of e.g. 1.0 can be applied to S, where aroused is detected when S above or equals to 1.0 and non-aroused is detected for S below 1.0. Further, a sentiment level may be determined or obtained for the sentiment "aroused" or "non-aroused", e.g. in the range 0-1, where S may be divided by two (e.g. the number of speaker features that are part of the sum). Further, a sentiment confidence score may be determined or obtained based on the absolute value of the numeric difference of the normalised F0 variance and/or the normalised signal intensity variance.

A ML model may be trained based on e.g. recording of calls, where a validator or supervisor, such as a psychologist and/or human supervisor, have assigned sentiment identifiers/labels for a sentiment metric, e.g. based on their own subjective best effort judgement, and/or speaker feature labels for a speaker feature. A speaker feature may be determined algorithmically via signal processing algorithms and/or as an output of another ML model. The one or more first sentiment metrics may be inferred by the ML model. An input to the ML model may comprise one or more of an acoustic features, such as a loudness and/or pitch feature. A tone feature may be determined with a ML model, and may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. log Mel-Spec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer.

In one or more exemplary methods, the one or more first sentiment metrics $SM\_1\_i$ includes a first secondary sentiment metric also denoted $SM\_1\_2$, indicative of a secondary sentiment state of the first speaker.

The secondary sentiment state may be different from the primary sentiment state. In other words, $SM\_1\_2$ may be indicative of a secondary emotion of the first speaker. $SM\_1\_2$ may be a less dominating sentiment state than the primary sentiment state and/or a second sentiment state in time of the first speaker. The secondary sentiment state may be one of disappointed, bored, afraid, sad, negative, frustrated, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, helpful, interested, and happy.

In one or more exemplary methods/systems, the secondary sentiment state of the first speaker may be selected from a secondary set of sentiment states.

A first sentiment metric $SM\_1\_i$ may comprise a first sentiment type identifier, also denoted $ST\_ID\_1\_i$, where i is an index. In other words, determining one or more first sentiment metrics $SM\_1\_i$ may comprise determining a first sentiment type identifier $ST\_ID\_1\_i$, e.g. a first secondary sentiment type identifier $ST\_ID\_1\_2$ of the first secondary sentiment metric $SM\_1\_2$. A sentiment type identifier is indicative of a sentiment state of a speaker.

A sentiment type identifier may for example be a label, a number or value, such as an integer, corresponding to a specific sentiment (state), a sentiment type and/or a sentiment class. For example, $ST\_ID\_1\_i$ may respectively be selected from the same or different sets of sentiment type identifiers. For example, $ST\_ID\_1\_2$ may be selected from a secondary set of sentiment type identifiers.

In one or more exemplary methods, the first secondary sentiment metric $SM\_1\_2$ comprises a first secondary sentiment type identifier $ST\_ID\_1\_2$ selected from a secondary set of sentiment type identifiers $ST\_ID\_SET\_2$, where $ST\_ID\_SET\_2$ comprises a plurality of sentiment type identifiers, e.g. including at least three, four, five or more sentiment type identifiers.

In one or more exemplary methods, the secondary set of sentiment type identifiers $ST\_ID\_SET\_2$ is given by:

$ST\_ID\_SET\_2=\{1,2,3,4,5\}$, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the secondary set of sentiment type identifiers $ST\_ID\_SET\_2$ is given by:

$ST\_ID\_SET\_2=\{$"Very negative", "Negative", "Neutral", "Positive", "Very positive"$\}$, e.g. where "Very negative" and/or "Very positive" is optional.

In one or more exemplary methods, the secondary set of sentiment type identifiers $ST\_ID\_SET\_2$ is given by:

$ST\_ID\_SET\_2=\{1,2,3,4,5\}$, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the secondary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding $ST\_ID\_1\_i$. For example, the first secondary sentiment metric $SM\_1\_2$ may comprise a first secondary sentiment type identifier $ST\_ID\_1\_2$ indicative of or corresponding to the secondary sentiment state or the first speaker state being "positive". A first sentiment metric $SM\_1\_i$ may comprise a sentiment level, also denoted $SL\_1\_i$, $i=1, 2, \ldots, O$, where O is the number of sentiment levels. In other words, determining $SM\_1\_i$ may comprise determining $SL\_1\_i$, e.g. determining $SM\_1\_2$ may comprise determining a first secondary sentiment level $SL\_1\_2$. A sentiment level $SL\_1\_i$ may indicate a level of the i'th sentiment type. In other words, $SL\_1\_i$ may indicate a degree of the i'th sentiment type. For example, when $ST\_ID\_1\_2$ corresponds to the first speaker state "positive", a first secondary sentiment level $SL\_1\_2$ may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric $SM\_1\_i$ may comprise a confidence score, respectively denoted $SCS\_1\_i$, $i=1, 2, \ldots, P$, where P is the number of confidence scores. In other words, determining $SM\_1\_i$ may comprise determining a first confidence score $SCS\_1\_i$, e.g. determining first secondary sentiment metric $SM\_1\_2$ may comprise determining a first secondary confidence score $SCS\_1\_2$. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_2=0.88 may be indicative of a probability of 88% that the determined ST_ID_1_2, e.g. being "positive", is correct.

The method comprises detecting a termination of a conversation, such as a termination of the first conversation. In other words, the method comprises detecting a termination of speech. Detecting a termination of the first conversation may comprise detecting a termination of the first speaker and/or the second speaker talking or speaking. A termination of the first conversation may for example be a termination of a call, a termination of a sentence, or a termination of a monologue. Detecting a termination of a conversation may comprise detecting a pause longer e.g. than 5 s, 10 s, 30 s, or 1 min. Detecting a termination of a conversation may comprise detecting a user input, one or more speakers talking to another person, a hang up of a call, and/or calendar data.

In one or more exemplary methods, the method comprises, in accordance with detecting the termination of the first conversation, determining first conversation data based on the first speaker metric data. In one or more exemplary methods, the method comprises transmitting the first conversation data to a server device of the system.

In one or more exemplary methods, the method comprises, in accordance with detecting the termination of the first conversation, storing the first conversation data, such as a speaker record, in the memory. In one or more exemplary methods, the first conversation data comprises a first speaker record indicative of one or more of first speaker metric data, e.g. first primary speaker metric data, first secondary speaker metric data, and/or first tertiary speaker metric data.

In one or more exemplary methods, the first speaker metric data comprises first tertiary speaker metric data being appearance metric data. Determining first speaker metric data SPMD_1 may comprise determining first tertiary speaker metric data, also denoted SPMD_1_3. In other words, the first speaker metric data SPMD_1 may comprise first tertiary speaker metric data SPMD_1_3. Determining first tertiary speaker metric data SPMD_1_3 may comprise determining appearance metric data, also denoted AMD.

In one or more exemplary methods, determining first tertiary speaker metric data SPMD_1_3 may comprise determining one or more first appearance metrics, also denoted AM_1_$i$, i=1, 2, Q, where Q is the number of first appearance metrics of or associated with the first speaker. In other words, the appearance metric data AMD may comprise one or more first appearance metrics over time, e.g. over the first conversation.

In one or more exemplary methods, the first avatar is based on the first tertiary speaker metric data.

An appearance metric is indicative of an appearance of a speaker. The first speaker metric data may comprise one or more first appearance parameters, e.g. comprised in the appearance metric data AMD. The one or more first appearance parameters may be based on the one or more first appearance metrics. For example, the appearance metric data AMD may be indicative of, or comprise a first appearance parameter being a mean appearance of a speaker over a conversation and/or an appearance outcome of a conversation (e.g. the overall appearance of the speaker when the conversation is terminated). Appearance metric data AMD may be indicative of a mean appearance of a speaker over a conversation. An appearance metric may comprise one or more of an appearance identifier, appearance level(s), and a confidence score, and may be indicative of an appearance of the first speaker, e.g. based on the first audio signal and/or a second audio signal. Determining one or more first appearance metrics may comprise retrieving first appearance metric(s) from a database, e.g. based on information related to the first speaker stored in the database. The one or more first appearance metrics AM_1_$i$ may comprise one or more parameters indicative of the appearance of the first speaker. The one or more first appearance metrics AM_1_$i$ include a first primary appearance metric, also denoted AM_1_1, indicative of a primary appearance of the first speaker and/or a first secondary appearance metric, also denoted AM_1_2, indicative of a secondary appearance of the first speaker.

In other words, AM_1_1 may be indicative of a primary physical appearance of the first speaker. AM_1_1 may be selected from a gender metric (e.g. woman/female, man/male, or no gender), a weight metric, a height metric, an age metric, a language metric, a language capability metric, a hearing capability metric, a dialect metric, a health metric (e.g. respiratory condition, speech deficiency, and/or speaking impairment), a personality metric (e.g. extrovert or introvert person), and an understanding capability metric (e.g. based on age metric, health metric, and/or gender metric). The understanding capability metric may for be relevant when an old person has difficulties hearing a conversation, or a foreigner who's not comfortable in the spoken language. The understanding capability metric may provide an indication to the user e.g. that he/she shall speak slower and more articulated.

A first appearance metric AM_1_$i$ may comprise a first appearance identifier, also denoted A_ID_1_$i$, where I is an index of the i'th first appearance metric, i=1, 2, . . . I, where I is the number of first appearance identifiers. A first appearance identifier may be indicative of one of a gender metric, a weight metric, a height metric, an age metric, a language metric, a language capability metric, a hearing capability metric, and an understanding capability metric. In other words, determining AM_1_$i$ may comprise determining A_ID_1_$i$, including a first primary appearance identifier A_ID_1_1 of a first primary appearance metric AM_1_1 and/or a first secondary appearance identifier A_ID_1_2 of a first secondary appearance metric AM_1_2.

An appearance identifier may for example be a label, a number or a value, such as an integer, corresponding to a specific appearance metric, appearance type and/or an appearance class. For example, A_ID_1_$i$ may be chosen from a set of appearance types, e.g. including one or more of gender, height, weight, height, age, language, language capability, hearing capability, and understanding capability. The appearance metric identifier may be a label or a number that is mapped to and/or indicative of the type of appearance metric.

In one or more exemplary methods, the first primary appearance metric AM_1_1 comprises a first primary appearance identifier A_ID_1_1 optionally selected from a primary set of appearance identifiers A_ID_SET_1, where A_ID_SET_1 comprises a plurality of appearance identifiers, e.g. including at least three, four, five or more sentiment type identifiers. In one or more exemplary methods, the first primary appearance metric AM_1_1 is a gender metric, i.e. first primary metric identifier A_ID_1_1 is indicative of gender, e.g. A_ID_1_1="Gender" or A_ID_1_1=1 that can be mapped to gender via a table.

In one or more exemplary methods, the first secondary appearance metric AM_1_2 comprises a first secondary appearance identifier A_ID_1_2 optionally selected from a secondary set of appearance identifiers A_ID_SET_2, where A_ID_SET_2 comprises a plurality of appearance identifiers, e.g. including at least three, four, five or more appearance identifiers. In one or more exemplary methods, the first secondary appearance metric AM_1_2 is an age metric, i.e. first secondary metric identifier A_ID_1_2 is indicative of age, e.g. A_ID_1_2="Age" or A_ID_1_2=2 that can be mapped to age via a table.

A set of appearance identifiers may comprise two or at least three or at least four different appearance identifiers, such as five, six, seven, eight, nine, or more appearance identifiers. For example, the first primary appearance metric AM_1_1 may comprise a first primary appearance identifier A_ID_1_1 indicative of or corresponding to the primary appearance of the first speaker, e.g. one of gender, weight, height, age, language, language capability, hearing capability, and understanding capability. For example, a first secondary appearance identifier A_ID_1_2 may be indicative of or correspond to a first second appearance of the first speaker, e.g. one of gender, weight, height, age, language, language capability, hearing capability, and understanding capability. The first secondary appearance identifier is optionally different from the first primary appearance identifier.

A first appearance metric AM_1_$i$ may comprise an appearance level, also denoted AL_1_$i$, i=1, 2, . . . , R, where R is the number of appearance levels. In other words, determining AM_1_$i$ may comprise determining AL_1_$i$, e.g. determining AM_1_1 may comprise determining a first primary appearance level AM_1_1. The first appearance level AL_1_$i$ may indicate a level, value, range, or label of the appearance metric AM_1_$i$ as indicated by the appearance identifier A_ID_1_$i$. In other words, a first appearance level AL_1_$i$ may indicate a level, value, range, or label of the first appearance metric AM_1_$i$. For example, when A_ID_1_1 corresponds to the first primary appearance of the first speaker being "gender", a first primary appearance level AL_1_1 may be indicative of or correspond to "male", "female" or optionally "unisex". For example, when first secondary appearance identifier A_ID_1_2 corresponds to the first secondary appearance metric of the first speaker being "height", a first secondary appearance level AL_1_2 may be indicative of or correspond to "short", "medium" or "tall". For example, when first secondary appearance identifier A_ID_1_2 corresponds to the first secondary appearance of the first speaker being "height", a first secondary appearance level AL_1_2 may be indicative of or correspond to "less than 160 cm", "between 160 cm and 185 cm" or "taller than 185 cm".

For example, when a first appearance identifier, such as first tertiary appearance identifier A_ID_1_3, corresponds to a first appearance metric, such as first tertiary appearance metric AM_1_3, of the first speaker being "age", a first tertiary appearance level AL_1_3 may be indicative of or correspond to an age range such as "younger than 20 years", "20-40 years", "40-60 years", or "older than 60 years" or an age label, such as "young", "mid-aged" or "old".

A first appearance metric AM_1_$i$ may comprise a confidence score, also denoted ACS_1_$i$, i=1, 2, . . . , S, where S is the number of confidence scores. In other words, determining a first appearance metric AM_1_$i$ may comprise determining a first appearance confidence score ACS_1_$i$, e.g. determining a first primary appearance metric AM_1_1 may comprise determining a first primary appearance confidence score ACS_1_1. A first appearance confidence score ACS_1_$i$ of an appearance metric AM_1_$i$ may be indicative a score or a probability of the determined first appearance metric AM_1_$i$, such as first appearance level AL_1_$i$, being correct, e.g. the appearance metric or appearance level being correct. For example, ACS_1_1=0.95 may be indicative of a probability of 95% that a determined AL_1_1 being "male" is correct.

Determining one or more first appearance metrics indicative of a first speaker may comprise extracting one or more speaker appearance features from the first audio signal. The one or more speaker appearance features may for example comprise a speaker tone feature, a speaker intonation feature, a speaker power feature, a speaker pitch feature, a speaker voice quality feature, a speaker rate feature, a linguistic feature, an acoustic feature, and/or a speaker spectral band energy feature.

A spectral band energy feature may comprise individual bins of spectrograms indicating a signal energy level at a given frequency.

A linguistic feature may comprise specific appearance related words such as positive and/or negative words. The linguistic feature may be determined based on a text transcript of the audio signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary methods, the one or more first appearance metrics may be determined based on a machine learning, ML, model, such as an output of a ML model. The one or more first appearance metrics may be inferred by the ML model. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100,000 parameters to 1,000,000 parameters, e.g. 500,000 to 1,000,000 parameters. A ML model may comprise layers in the range of 5 layers to 20 layers, e.g. 10 layers to 15 layers.

A ML model may be trained based on e.g. recording of calls, where a validator or supervisor, such as a human supervisor, have assigned sentiment identifiers/labels for a sentiment metric, and/or speaker feature labels for a speaker feature. A speaker feature may be determined algorithmically via signal processing algorithms. The one or more first appearance metrics may be inferred by the ML model. An input to the ML model may comprise audio data, such as audio data stored on a database of known audio data matching one or more appearance metrics, such as labels of appearance. A label of appearance may comprise a label assigned by a human and/or a ground truth, such as an age or a height from a passport or social registry. For example, the audio data input may comprise recording of calls, television shows, and/or movie actors or the like.

An input to the ML model may comprise one or more of an acoustic features, such as a tone feature. A tone feature may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. log MelSpec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer. For example, an acoustic feature related to one or more appearance metrics, such as physical appearance, may comprise ratios of vowel formants which correlate with vocal tract length. For example, acoustic features may relate to one or more appearance metrics such as body size, voice quality features, e.g. HNR, Jitter and/or Shimmer which correlate with age (e.g. more breathiness, more Jitter for higher age), pitch may correlate with gender (e.g. males may have a pitch below 150 Hz and females may have a pitch above 150 Hz). Further, acoustic features may for example comprise a phoneme inventory/histogram for language and dialect features, and/or average spectral envelope features e.g. for age, and/or gender.

In one or more exemplary methods, the one or more first appearance metrics AM_1_i includes a first secondary appearance metric, also denoted AM_1_2, indicative of a secondary appearance of the first speaker.

A first appearance metric AM_1_i may comprise a first appearance identifier, also denoted A_ID_1_i, where i is an index of the i'th first appearance metric. A first appearance identifier may be indicative of one of a gender metric, a weight metric, a height metric, an age metric, a language metric, a language capability metric, a hearing capability metric, and an understanding capability metric. In other words, determining AM_1_i may comprise determining A_ID_1_i, including a first secondary appearance identifier A_ID_1_2 of a first secondary appearance metric AM_1_2.

In one or more exemplary methods, the first secondary appearance metric AM_1_2 comprises a first secondary appearance identifier A_ID_1_2 optionally selected from a secondary set of appearance identifiers A_ID_SET_1, where A_ID_SET_1 comprises a plurality of appearance identifiers, e.g. including at least three, four, five or more sentiment type identifiers. In one or more exemplary methods, the first secondary appearance metric AM_1_2 is a gender metric, i.e. first secondary metric identifier A_ID_1_2 is indicative of gender, e.g. A_ID_1_2="Gender" or A_ID_1_2=1 that can be mapped to gender via a table.

In one or more exemplary methods, the first secondary appearance metric AM_1_2 comprises a first secondary appearance identifier A_ID_1_2 optionally selected from a secondary set of appearance identifiers A_ID_SET_2, where A_ID_SET_2 comprises a plurality of appearance identifiers, e.g. including at least three, four, five or more appearance identifiers. In one or more exemplary methods, the first secondary appearance metric AM_1_2 is an age metric, i.e. first secondary metric identifier A_ID_1_2 is indicative of age, e.g. A_ID_1_2="Age" or A_ID_1_2=2 that can be mapped to age via a table.

A set of appearance identifiers may comprise two or at least three or at least four different appearance identifiers, such as five, six, seven, eight, nine, or more appearance identifiers. For example, the first secondary appearance metric AM_1_2 may comprise a first secondary appearance identifier A_ID_1_2 indicative of or corresponding to the secondary appearance of the first speaker, e.g. one of gender, weight, height, age, language, language capability, hearing capability, and understanding capability. For example, a first secondary appearance identifier A_ID_1_2 may be indicative of or correspond to a first second appearance of the first speaker, e.g. one of gender, weight, height, age, language, language capability, hearing capability, and understanding capability. The first secondary appearance identifier is optionally different from the first secondary appearance identifier.

A first appearance metric AM_1_i may comprise an appearance level, also denoted AL_1_i, i=1, 2, . . . , R, where R is the number of appearance levels. In other words, determining AM_1_i may comprise determining AL_1_i, e.g. determining AM_1_2 may comprise determining a first secondary appearance level AM_1_2. The first appearance level AL_1_i may indicate a level, value, range, or label of the appearance metric AM_1_i as indicated by the appearance identifier A_ID_1_i. In other words, a first appearance level AL_1_i may indicate a level, value, range, or label of the first appearance metric AM_1_i. For example, when A_ID_1_2 corresponds to the first secondary appearance of the first speaker being "gender", a first secondary appearance level AL_1_2 may be indicative of or correspond to "male", "female" or optionally "unisex". For example, when first secondary appearance identifier A_ID_1_2 corresponds to the first secondary appearance metric of the first speaker being "height", a first secondary appearance level AL_1_2 may be indicative of or correspond to "short", "medium" or "tall". For example, when first secondary appearance identifier A_ID_1_2 corresponds to the first secondary appearance of the first speaker being "height", a first secondary appearance level AL_1_2 may be indicative of or correspond to "less than 160 cm", "between 160 cm and 185 cm" or "taller than 185 cm".

For example, when a first appearance identifier, such as first tertiary appearance identifier A_ID_1_3, corresponds to a first appearance metric, such as first tertiary appearance metric AM_1_3, of the first speaker being "age", a first tertiary appearance level AL_1_3 may be indicative of or correspond to an age range such as "younger than 20 years", "20-40 years", "40-60 years", or "older than 60 years" or an age label, such as "young", "mid-aged" or "old".

A first appearance metric AM_1_i may comprise a confidence score, also denoted ACS_1_i, i=1, 2, . . . , S, where S is the number of confidence scores. In other words, determining a first appearance metric AM_1_i may comprise determining a first appearance confidence score ACS_1_i, e.g. determining a first secondary appearance metric AM_1_2 may comprise determining a first secondary appearance confidence score ACS_1_2. A first appearance confidence score ACS_1_i of an appearance metric AM_1_i may be indicative a score or a probability of the determined first appearance metric AM_1_i, such as first appearance level AL_1_i, being correct, e.g. the appearance metric or appearance level being correct. For example, ACS_1_2=0.95 may be indicative of a probability of 95% that a determined AL_1_2 being "male" is correct.

The one or more first sentiment metrics and the one or more first appearance metrics may be part of first speaker metric data. First speaker metric data may also be denoted agent metric data and/or caller metric data.

The method comprises, in accordance with detecting the termination of the first conversation, determining a post-conversation representation, also denoted PCR, based on the speaker metric data SPMD, e.g. determining a first post-conversation representation, also denoted PCR_1, based on the first speaker metric data SPMD_1.

In one or more exemplary methods, determining a post-conversation representation PCR comprises determining a speaker representation, also denoted SR, based on the speaker metric data SPMD. A speaker representation may be indicative of a segment, such as a speech segment or utterance, which is analysed. For example, a voice activity detection module may identify one or more segments of speech/voice and discard the noise. A segment may for example be a speech segment of at least 5 seconds or at least 10 seconds. The voice activity detection module may detect pauses longer than e.g. 400 ms, 500 ms, or 1 second. A speech segment may be detected when a pause occurs, when another speaker starts speaking, or when a segment reaches a defined maximum length (e.g. at most 8 seconds) may indicate the end of the speech segment. For each speech segment one or more sentiment metrics and/or one or more appearance metrics may be determined. In other words, determining a first post-conversation representation PCR_1 comprises determining a first speaker representation, also denoted SR_1, based on the first speaker metric data SPMD_1. The first speaker representation may be based on one or more of the first primary speaker metric data SPMD_1_1, the first secondary speaker metric data SPMD_1_2, and the first tertiary speaker metric data SPMD_1_3. In one or more exemplary methods, determining the post-conversation representation comprises determining one or more sets of speaker representations, e.g. comprising a first set of speaker representations, a second set of speaker representations, and/or a third set of speaker representations. A set of speaker representations may comprise one or more speaker representations according to this disclosure. Different sets of speaker representations may combine different speaker representations such that the user may be provided with various representations depending on what he/she wants to see. The user may thereby change between the set of speaker representations, e.g. to show different speaker representations indicating different feedback to the user. For example, the one or more sets of speaker representations may be embodied as a carousel comprising one or more sets of speaker representations that the user may switch between. In other words, the user may switch between different views or user interfaces on the display.

In other words, determining a first post-conversation representation PCR_1 comprises determining a first primary speaker representation, also denoted SR_1_1, based on the first primary speaker metric data SPMD_1_1.

In one or more exemplary methods, the method comprises including the speaker representation SR in the post-conversation representation PCR. In other words, the method comprises including the first speaker representation SR_1 in the first post-conversation representation PCR_1. In other words, the method comprises including the first primary speaker representation SR_1_1 in the first post-conversation representation PCR_1. The first post-conversation representation PCR_1 may comprise one or more speaker representations, such as one or more of the first speaker representation SR_1, a first primary speaker representation SR_1_1, a first secondary speaker representation SR_1_2, a first tertiary speaker representation SR_1_3, a first quaternary speaker representation SR_1_4, a second speaker representation SR_2, a second primary speaker representation SR_2_1, a second secondary speaker representation SR_2_2, a second tertiary speaker representation SR_2_3, and a second quaternary speaker representation SR_2_4.

In one or more exemplary methods, the first primary speaker representation SR_1_1 comprises a first avatar based on the first primary speaker metric data SPMD_1_1.

In one or more exemplary methods, the first primary speaker representation SR_1_1 is based on the first tertiary speaker metric data SPMD_1_3.

In other words, the method comprises determining the first primary speaker representation, also denoted SR_1_1, based on the first primary speaker metric data SPMD_1_1 and/or the first tertiary speaker metric data SPMD_1_3.

In other words, the method comprises determining the first primary speaker representation SR_1_1, based on the first primary sentiment metric SM_1_1 and/or the first primary appearance metric AM_1_1. Determining SR_1_1 may comprise generating the first primary speaker representation SR_1_1 based on SM_1_1 and AM_1_1. The first speaker representation may be determined based on a public and/or a customer registration. For example, for a recurring caller/customer the first primary sentiment metric SM_1_1 and/or the first primary appearance metric AM_1_1 may be refined over multiple calls/conversations, e.g. the more a voice is heard, the audio data is obtained, and the more confidently it may be determined that the speaker is e.g. a male. One or more sentiment and/or appearance metrics may be known, e.g. an age from a social register and/or a sentiment state from a previous conversation. The one or more known sentiment and/or appearance metrics may be used to improve accuracy of the determination of the speaker representation and/or used to determine the speaker representation.

Thus, determining a first post-conversation representation may comprise determining one or more of SR_1_1, SR_1_2, SR_1_3, SR_1_4, and SR_1_5 based on the first audio signal, such as based on the first primary speaker metric data SPMD_1_1, the first secondary speaker metric data SPMD_1_2, and/or the first tertiary speaker metric data SPMD_1_3.

The first speaker representation may also be denoted a first person representation of the first conversation or during the first conversation, e.g. a last conversation or call.

The first primary speaker representation may be indicative of the first speaker state and/or the appearance of the first speaker during the first conversation, e.g. of a last call between an agent and a caller.

In other words, the first speaker representation, such as the first primary speaker representation, may be a mean speaker representation, e.g. comprising a mean first avatar, of the first speaker during the first conversation, such as a telephone call, between the first speaker and second speaker. The first speaker representation may be indicative of or reflect a mean, average (such as weighted average), and/or median sentiment, tone, and/or appearance of the first speaker. For example, the first speaker representation, such as the first primary speaker representation SR_1_1 may be an average physical and emotional representation of the first speaker.

An advantage of having a post-conversation representation, e.g. after a conversation may be that the user of the electronic device may see or be informed right after a conversation, such as call, about his/her performance or the outcome of the conversation in relation to the sentiment, the tone, and/or the first speaker appearance. Furthermore, the user of the electronic device may get a better feedback on his/her performance or on the outcome of the conversation. The post-conversation representation may provide a gamification of the users' performances. The post-conversation representation may for example increase the engagement of a user in his/her work, e.g. by being able to visualize an improvement of performances. The first speaker representation may provide a personification of the first speaker, a portrait of the first speaker, a shape of the first speaker, a sketch of the first speaker, and/or a gamification of the first speaker.

The first speaker representation may comprise sound representations, such as auditory feedback and/or audio icons.

The method comprises outputting, via the interface of the electronic device, the first post-conversation representation.

In one or more exemplary methods, outputting the first post-conversation representation may comprise outputting, via the interface of the electronic device, the first speaker representation SR_1. Outputting the first post-conversation representation PCR_1 may comprise displaying a first user interface indicative of the post-conversation representation. In one or more exemplary methods, outputting the first post-conversation representation PCR_1 may comprise outputting, via the interface of the electronic device, one or more of the first primary speaker representation SR_1_1, the first secondary speaker representation SR_1_2, the first tertiary speaker representation SR_1_3, and the first quaternary speaker representation SR_1_4.

Outputting the first speaker representation SR_1 may comprise displaying a first user interface indicative of the first speaker representation.

A user interface may comprise one or more, such as a plurality of, user interface objects. For example, the first user interface may comprise one or more first user interface objects, such as a first primary user interface object and/or a first secondary user interface object. A user interface object may refer herein to a graphical representation of an object that is displayed on an interface of the electronic device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user.

In one or more exemplary methods, the first speaker metric data comprises first secondary speaker metric data, also denoted SPMD_1_2. Determining first secondary speaker metric data SPMD_1_2 may comprise determining one or more first secondary speaker metrics SM_1_2 over time, e.g. over the first conversation. In other words, the first speaker metric data SPMD_1 may comprise first secondary speaker metric data SPMD_1_2.

In one or more exemplary methods, the method comprises determining a first secondary speaker representation SR_1_2 based on the first speaker metric data SPMD_1, e.g. on the first secondary speaker metric data SPMD_1_2, and including the first secondary speaker representation SR_1_2 in the first post-conversation representation PCR_1.

In one or more exemplary methods, the first speaker representation SR_1, such as the first secondary speaker representation SR_1_2, is based on historic first speaker metric data SPMD_1, such as first secondary speaker metric data SPMD_1_2. The term historic first speaker metric data may be understood as first speaker metric data based one or more historic or previous conversations or calls.

In one or more exemplary methods, the first secondary speaker representation SR_1_2 comprises a representation of a number X of historic conversations, e.g. before the first conversation or including the first conversation, based on historic first secondary speaker metric data of historic conversations. For example, X may be a number of past or historic conversations, such as X=5 the first secondary speaker representation SR_1_2 comprises a representation of the last five conversations of the first speaker, such as the last five calls of an agent and/or a caller. Alternatively or additionally, the first secondary speaker representation SR_1_2 comprises a representation of the last five conversations of a team of the user/speaker, e.g. for the user to be able to compare his/her performances to his/her teammates. The first secondary speaker representation SR_1_2 may comprise a representation indicating that the first conversation, e.g. the last conversation, has been the best conversation of the day, the best conversation of the week, the best conversation of the month, and/or the best conversation of the year for the first speaker (e.g. a caller and/or agent). In other words, the first secondary speaker representation SR_1_2 may comprise a representation indicating that the first conversation has been the conversation where the first speaker (e.g. caller and/or agent) have had the best performance, e.g. the best conversation score, within a certain period.

In one or more exemplary methods, the first secondary speaker metric data SPMD_1_2 is tone metric data, also denoted TMD. Determining first secondary speaker metric data SPMD_1_2 may comprise determining tone metric data. In one or more exemplary methods, determining first secondary speaker metric data SPMD_1_2 may comprise determining one or more first tone metrics, also denoted TM_1_i, i=1, 2, . . . , m, where m is the number of first tone metrics. In other words, the tone metric data TMD may comprise one or more first tone metrics over time, e.g. over the first conversation.

A tone metric is indicative of a tone of a speaker. The first speaker metric data may comprise one or more first tone parameters, e.g. comprised in the tone metric data TMD. The one or more first tone parameters may be based on the one or more first tone metrics. For example, the tone metric data TMD may be indicative of, or comprise a first tone parameter being a mean tone of a speaker over a conversation and/or a tone outcome of a conversation (e.g. the overall tone of the speaker when the conversation is terminated). Tone metric data TMD may be indicative of a mean tone of a speaker over a conversation. Tone metric data TMD may comprise one or more speech metrics. In other words, the tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more metrics.

In one or more exemplary methods, the first speaker representation is a caller representation. The first speaker representation may be a first participant representation, e.g. in or during a conversation, such as a meeting. The first speaker representation may be a first presenter representation, e.g. in or during a talk or presentation. The caller representation may be a representation of a person calling a call center, such as a support call center.

In one or more exemplary methods, the first speaker representation is an agent representation. The agent representation may be a representation of an agent answering calls at a call center, such as a support call center.

In one or more exemplary methods, determining the first speaker representation SR_1, such as determining a first primary speaker representation SR_1_1 of the first speaker representation SR_1, comprises determining one or more first features F_1_i, i=1, . . . , K, where K is the number of first features. The one or more first features may include a first primary feature also denoted F_1_1 and/or a first secondary feature also denoted F_1_2 of the first primary speaker representation SR_1_1. The number L of first features may be 2, 3, 4, 5, or more. The first primary speaker representation SR_1_1 may be or comprise a first avatar, a first emoji, a first smiley, a first icon, a first image, a first animation, and/or a first visual graphical representation simulation.

In one or more exemplary methods, determining the first primary speaker representation SR_1_1 comprises determining a first primary feature, also denoted F_1_1, and/or a first secondary feature, also denoted F_1_2, of a first avatar based on the first primary speaker metric data SPMD_1_1, e.g. the first primary sentiment metric SM_1_1 and/or based on the first tertiary speaker metric data SPMD_1_3, e.g. the first primary appearance metric AM_1_1. Optionally, the first speaker representation, such as a first primary speaker representation SR_1_1 of the first speaker representation SR_1, comprises the first avatar. Determining SR_1, such as determining SR_1_1, may comprise determining one or more features, such as first features, based on one or more sentiment metrics, such as first sentiment metrics. Determining SR_1, such as determining SR_1_1, may comprise determining one or more features, such as first features, based on one or more sentiment metrics, such as first sentiment metrics and/or one or more appearance metrics. Determining SR_1, such as determining SR_1_1, may comprise determining F_1_1 based on SM_1_1 and/or AM_1_1. In other words, the first speaker representation SR_1, such as the first primary speaker representation SR_1_1, may be based on one or more first features, e.g. based on F_1_1 and F_1_2.

The first primary feature F_1_1 may be indicative of the first primary speaker metric data SPMD_1_1, e.g. the first primary sentiment metric SM_1_1. In other words, F_1_1 may be indicative of the primary sentiment state indicated by SM_1_1. For example, when the primary sentiment state indicated by SM_1_1 is negative, F_1_1 may be indicative of a negative feature, e.g. negative eyes or negative mouth.

F_1_1 may be selected from a list of features and/or a class of features. F_1_1 may be selected or chosen from a set of features, e.g. a set of feature types and a number or value may be assigned to each feature type of the set of feature types.

The first primary representation, such as the first avatar, may be indicative of the primary sentiment state of the first speaker. The first avatar may be a real-time physical and/or emotional representation of the first speaker. The first avatar may be a representation of a facial expression being indicative of the sentiment state of the speaker and/or the appearance of the first speaker. The term representation may be understood as one or more of an avatar, a smiley, an emoji, an emoticon, a portrait, a personification, a sketch, an animation, a visual graphical representation simulation, and a shape. The first primary representation, such as the first avatar, may be a sum of one or more first features representing one or more sentiments or sentiment states of the first speaker and/or one or more appearances of the first speaker. The first primary representation, such as the first avatar may at least comprise one feature, at least two features, at least five features, at least ten features.

In one or more exemplary methods, the first primary feature F_1_1 is selected from a mouth feature, an eye feature, a nose feature, a forehead feature, an eyebrow feature, a hair feature, an ear feature, a beard feature, a colour feature, a gender feature, a cheek feature, an accessory feature, a skin feature, a body feature, a torso feature, a leg feature, a height feature, a foot feature, and a head dimension feature.

First features F_1_i, such as F_1_1, may comprise a feature identifier, also denoted F_ID_i, i=1, 2, . . . L, where L is the number of feature identifiers. In other words, determining one or more first features of the first primary representation, may comprise determining a first primary identifier F_ID_1_1 of the first primary feature.

The feature identifiers, e.g. of the first features, may for example be a number, value, such as an integer, or a label corresponding to or indicative of a feature type. For example, F_ID_1_i may be chosen from a set of feature types and a number or value may be assigned to each feature type of the set of feature types. The set of feature types may comprise at least five different feature types, e.g. L=5, at least ten different feature types, e.g. L=10, or at least twenty feature types, e.g. L=20. For example, the first feature type identifier F_ID_1 may be indicative or correspond to the feature type "eyes", "mouth", "nose", "forehead", "eyebrow", "hair", "ear", "beard", "gender", "cheek", "accessory", "skin", "body, or "head dimension".

First features F_1_i, such as F_1_1, may comprise a feature level, also denoted FL_i, i=1, 2, . . . F, where F is the number of feature levels. In other words, determining one or more first features of the first primary representation may comprise determining a first primary feature level FL_1_1 of the first primary feature. The first feature level FL_1_i may indicate a level, value, range, or label of the first feature F_1_i, e.g. as indicated by the feature identifier F_ID_1_i. In other words, a first feature level FL_1_i may indicate a level, value, range, or label of the first feature F_1_i. For example, when F_ID_1_1 corresponds to the first feature of the first speaker being "head dimension", a first primary feature level FL_1_1 may be indicative of or correspond to "male head dimension", "female head dimension" or optionally "unisex head dimension", e.g. based on one or more sentiment metrics and/or one or more appearance metrics. First features F_1_i, such as F_1_1, may comprise a plurality of feature levels, also denoted F_1_i_j. Thereby, a first feature may be based on a plurality of metrics, such as a sentiment metric and an appearance metric. For example, a first feature, such as F_1_2, having feature identifier F_ID_1_2="eyes" may comprise first feature levels FL_1_2_1="angry" and FL_1_2_2="female", in turn allowing the eyes feature of the first speaker representation to indicate an angry female.

In one or more exemplary methods/systems, determining one or more first features F_1_i, is based on, such as mapped from, one or more first sentiment metrics and/or one or more first appearance metrics.

Determining a first primary speaker representation may comprise selecting a first avatar from a library of avatars, e.g. based on one or more of first features, first sentiment metric(s), and first appearance metric(s). Determining a first primary speaker representation may comprise building and/or generating a first avatar comprising one or more first feature icons, optionally where one or more, such as each, first feature icon is based on one or more first features. In other words, determining a first primary speaker representation may comprise selecting first feature icons from a library of first feature icons optionally based on one or more of first features, first sentiment metric(s), and first appearance metric(s) and including the first feature icons in the first primary speaker representation, such as in the first avatar.

In one or more exemplary methods, determining the first speaker representation SR_1, such as determining first primary speaker representation SR_1_1, comprises determining a first secondary feature F_1_2 of the first primary speaker representation SR_1_1, such as the first avatar, based on the first primary sentiment metric SM_1_1 and/or based on the first primary appearance metric AM_1_1.

Determining SR_1 may comprise determining F_1_2 based on SM_1_1 and/or AM_1_1. In one or more exemplary methods, determining SR_1 may comprise determining F_1_2 based on SM_1_1, SM_1_2, AM_1_1, and/or AM_1_2.

The first secondary feature F_1_2 may be indicative of the first primary appearance metric AM_1_1. In other words, F_1_2 may be indicative of the primary appearance indicated by AM_1_1. For example, when the primary appearance indicated by AM_1_1 is "old", F_1_2 may be indicative of an old feature, e.g. wrinkled eyes or wrinkled mouth.

F_1_2 may be selected from a list of features and/or a class of features. F_1_2 may be selected or chosen from a set of features, e.g. a set of feature types and a number or value may be assigned to each feature type of the set of feature types.

In one or more exemplary methods, the first secondary feature is different from the first primary feature and is selected from a mouth feature, an eye feature, a nose feature, a forehead feature, an eyebrow feature, a hair feature, an ear feature, a beard feature, a colour feature, a gender feature, a cheek feature, an accessory feature, a skin feature, a body feature, a torso feature, a leg feature, a height feature, a foot feature, and a head dimension feature.

First features F_1_$i$, such as F_1_2, may comprise a feature identifier, also denoted F_ID_$i$, $i=1, 2, \ldots L$. In other words, determining one or more first features of the first primary representation, may comprise determining a first secondary identifier F_ID_1_2 of the first secondary feature.

The feature identifiers, e.g. of the first features, may for example be a number, value, such as an integer, or a label corresponding to or indicative of a feature type. For example, F_ID_1_$i$ may be chosen from a set of feature types and a number or value may be assigned to each feature type of the set of feature types. The set of feature types may comprise at least five different feature types, e.g. L=5, at least ten different feature types, e.g. L=10, or at least twenty feature types, e.g. L=20. For example, the first feature type identifier F_ID_1 may be indicative or correspond to the feature type "eyes", "mouth", "nose", "forehead", "eyebrow", "hair", "ear", "beard", "gender", "cheek", "accessory", "skin", "body", or "head dimension".

First features F_1_$i$, such as F_1_2, may comprise a feature level, also denoted FL_$i$, $i=1, 2, \ldots F$. In other words, determining one or more first features of the first primary representation may comprise determining a first secondary feature level FL_1_2 of the first secondary feature. The first feature level FL_1_$i$ may indicate a level, value, range, or label of the first feature F_1_$i$, e.g. as indicated by the feature identifier F_ID_1_$i$. In other words, a first feature level FL_1_$i$ may indicate a level, value, range, or label of the first feature F_1_$i$. For example, when F_ID_1_2 corresponds to the first feature of the first speaker being "head dimension", a first secondary feature level FL_1_2 may be indicative of or correspond to "male head dimension", "female head dimension" or optionally "unisex head dimension", e.g. based on one or more sentiment metrics and/or one or more appearance metrics. First features F_1_$i$, such as F_1_2, may comprise a plurality of feature levels, also denoted F_1_$i$_$j$. Thereby, a first feature may be based on a plurality of metrics, such as a sentiment metric and an appearance metric. For example, a first feature, such as F_1_2, having feature identifier F_ID_1_2="eyes" may comprise first feature levels FL_1_2_1="angry" and FL_1_2_2="female", in turn allowing the eyes feature of the first speaker representation to indicate an angry female.

In one or more exemplary methods, determining a first post-conversation representation comprises determining a first tertiary speaker representation, also denoted SR_1_3, based on first speaker metric data SPMD_1 and including the first tertiary speaker representation SR_1_3 in the first post-conversation representation PCR_1. In one or more exemplary methods, the first tertiary speaker representation is indicative of a sentiment distribution of the first speaker during the first conversation.

In one or more exemplary methods, the first tertiary speaker representation SR_1_3 comprises a representation of a sentiment distribution of the first speaker and/or the second speaker, e.g. during the first conversation. Determining a first tertiary speaker representation SR_1_3 may be based on the first primary speaker metric data SPMD_1_1, e.g. being sentiment metric data SMD, based on the first secondary speaker metric data SPMD_1_2, e.g. being tone metric data TMD, and/or based on the first tertiary speaker metric data SPMD_1_3, e.g. being appearance metric data AMD. The first tertiary speaker representation SR_1_3 may comprise a representation of a sentiment distribution of one or more first sentiment type identifiers ST_ID_1_$i$ of the first speaker, e.g. one or more first speaker states, and/or one or more first sentiment type identifiers ST_ID_2_$i$ of the second speaker, e.g. one or more second speaker states.

In other words, the first tertiary speaker representation SR_1_3 may comprise a representation indicative of a time duration of the first conversation or a time duration of the first speaker speaking during the first conversation, during which the first speaker have had one or more first sentiment type identifiers ST_ID_1_$i$. A sentiment distribution may for example be, during 86% of the first conversation duration the first speaker have had the first speaker state "very negative", during 14% of the first conversation duration the first speaker have had the first speaker state "negative", during 0% of the first conversation duration the first speaker have had the first speaker state "neutral", during 0% of the first conversation duration the first speaker have had the first speaker state "positive". The first tertiary speaker representation SR_1_3 may comprise a representation of a turn or a flip of a speaker (e.g. turning a customer from negative to positive or vice-versa).

The first tertiary speaker representation SR_1_3 may comprise a representation of a sentiment distribution of one or more first sentiment levels SL_1_$i$ of the first speaker and/or one or more first sentiment levels SL_2_$i$ of the second speaker.

The first tertiary speaker representation SR_1_3 may comprise a representation of a sentiment distribution of one or more first confidence scores SCS_1_$i$ of the first speaker and/or one or more second confidence scores SCS_2_$i$ of the second speaker.

In one or more exemplary methods, determining a first post-conversation representation comprises determining a first quaternary speaker representation SR_1_4 based on first speaker metric data SPMD_1 and including the first quaternary speaker representation SR_1_4 in the first post-conversation representation PCR_1. In one or more exemplary methods, the first quaternary speaker representation SR_1_4 is indicative of a conversation score, such as call score, of the first speaker, e.g. during the first conversation.

In one or more exemplary methods, the first quaternary speaker representation SR_1_4 comprises a representation of a conversation score, e.g. a mean conversation score, of the first speaker and/or the second speaker, e.g. during the first conversation.

Determining a first quaternary speaker representation SR_1_4 may be based on the first primary speaker metric data SPMD_1_1, e.g. being sentiment metric data SMD, based on the first secondary speaker metric data SPMD_1_2, e.g. being tone metric data TMD, and/or based on the first tertiary speaker metric data SPMD_1_3, e.g. being appearance metric data AMD. In other words, the determined first primary speaker metric data SPMD_1_1, the first secondary speaker metric data SPMD_1_2, and/or the first tertiary speaker metric data SPMD_1_3 may be used to determine, such as transformed, to a conversation score. The conversation score may be determined based on one or more metrics satisfying one or more criteria or not. The conversation score may be a score between 0 and 20, 0 and 10, or 0 and 5. The conversation score may comprise one, two, or three digits after the decimal point. The first quaternary speaker representation SR_1_4 may comprise a representation indicating that the conversation score, e.g. of the first conversation, e.g. the last conversation, has been the best conversation score of the day, the best conversation score of the week, the best conversation score of the month, and/or the best conversation score of the year for the first speaker and/or the second speaker (e.g. caller and/or agent). In other words, the first quaternary speaker representation SR_1_4 may comprise a representation indicating that the first conversation has been the conversation where the first speaker and/or the second speaker (e.g. caller and/or agent) have had the best performance, e.g. the best conversation score, within a certain period. The first quaternary speaker representation SR_1_4 may comprise a first quaternary colour based on the one or more speaker metric data. For example, when the conversation score is in a first range, a first colour may be assigned to the first quaternary speaker representation SR_1_4.

The first quaternary speaker representation SR_1_4 may comprise a first quaternary size based on the one or more speaker metric data. For example, when the conversation score is in a first range, a first size may be assigned to the first quaternary speaker representation SR_1_4. The first quaternary speaker representation SR_1_4 may comprise a first quaternary height based on the one or more speaker metric data. For example, when the conversation score is in a first range, a first height may be assigned to the first quaternary speaker representation SR_1_4. The first quaternary speaker representation SR_1_4 may comprise a first quaternary animation based on the one or more speaker metric data. For example, when the conversation score is the best of the day, a first animation may be assigned to the first quaternary speaker representation SR_1_4.

In one or more exemplary methods, the one or more audio signals comprising a second audio signal, also denoted AS_2. In one or more exemplary methods, obtaining one or more audio signals comprises obtaining a second audio signal. The second audio signal may be representative of second speech/voice of a second speaker. The second speaker may be a caller, an agent, or a second participant in a telephone conversation or a meeting.

Obtaining one or more audio signals may comprise obtaining one or more audio inputs, such as a second audio input. In other words, the second audio signal may be based on the second audio input. The second audio signal may be obtained from a call or conversation between the user and another person, e.g. a first call or the first conversation. The second speaker may be the person speaking/talking the second most during the first call and/or the first conversation. The second speaker may be the second person speaking during the first call and/or first conversation. The second speaker may be a person speaking with a person of interest, e.g. being the first speaker. The second speaker may be a user wanting a representation of the first speaker, such as the first speaker representation. The second audio signal may be obtained from the electronic device recording second audio input from a second speaker, such as recording the second speaker speaking or talking. Obtaining one or more audio signals may comprise generating one or more audio signals, including the second audio signal. The second audio signal may be based on the second audio input. The second audio signal may comprise a second speaker audio signal. The second audio signal may be an agent audio signal or a caller audio signal, and a second audio signal is the other.

In one or more exemplary methods, the method comprises determining second speaker metric data, also denoted SPMD_2, of a second speaker based on the second audio signal. In one or more exemplary methods, the second speaker metric data SPMD_2 includes second primary speaker metric data SPMD_2_1. In one or more exemplary methods, the first post-conversation representation PCR_1 is based on the second speaker metric data SPMD_2. Determining second primary speaker metric data SPMD_2_1 may comprise determining one or more second primary speaker metrics SM_2_1 over time, e.g. over the first conversation. In other words, the second speaker metric data SPMD_2 may comprise second primary speaker metric data SPMD_2_1. Further, the second speaker metric data may comprise or be indicative of one or more of the second primary speaker metric data SPMD_2_1 comprising one or more second primary speaker metrics, second secondary speaker metric data SPMD_2_2 comprising one or more second secondary speaker metrics, and second tertiary speaker metric data SPMD_2_3 comprising one or more second tertiary speaker metrics.

In one or more exemplary methods, the second primary speaker metric data SPMD_2_1 is sentiment metric data. The description of the first primary speaker metric data being sentiment metric data may also apply to the second primary speaker metric data being sentiment metric data.

In one or more exemplary methods, the second primary speaker representation comprises a second avatar based on the second primary speaker metric data. The second primary speaker representation is optionally based on the second audio signal for the second speaker and may be a primary speaker representation, e.g. as described in relation to the first primary speaker representation. In other words, the description of the first primary speaker representation may also apply to the second primary speaker representation.

Determining second primary speaker metric data SPMD_2_1 may comprise determining sentiment metric data, also denoted SMD. In one or more exemplary methods, determining second primary speaker metric data SPMD_2_1 may comprise determining one or more second sentiment metrics, also denoted SM_2_$i$, i=1, 2, ..., A, where A is the number of second sentiment metrics. In other words, the sentiment metric data SMD may comprise one or more second sentiment metrics SM_2 over time, e.g. over the first conversation.

The one or more second sentiment metrics, such as SM_2_1 and/or SM_2_2, are indicative of a second speaker state, i.e. one or more first sentiment states of the second speaker, and may be based on the first audio signal and/or the second audio signal. The one or more second sentiment metrics SM_2_i may comprise one or more parameters indicative of the second speaker state.

The one or more second sentiment metrics SM_2_i include a second primary sentiment metric, also denoted SM_2_1 indicative of a primary sentiment state of a second speaker.

In other words, SM_2_1 may be indicative of a primary emotion of the second speaker. SM_2_1 may be indicative of a dominating sentiment state and/or a second sentiment state in time of the second speaker. The primary sentiment state may be one of disappointed, bored, afraid, sad, negative, very negative, frustrated, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, helpful, interested, and happy. In one or more exemplary methods/systems, the primary sentiment state of the second speaker may be selected from a primary set of sentiment states.

A second sentiment metric SM_2_i may comprise a second sentiment type identifier, also denoted ST_ID_2_i, i=1, 2, . . . B, where B is the number of second sentiment type identifiers, where i is an index. In other words, determining one or more second sentiment metrics SM_2_i may comprise determining a second sentiment type identifier ST_ID_2_i, e.g. a second primary sentiment type identifier ST_ID_2_1 of the second primary sentiment metric SM_2_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_2_i may respectively be selected from the same or different sets of sentiment type identifiers. For example, ST_ID_2_1 may be selected from a primary set of sentiment type identifiers and/or ST_ID_2_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the second primary sentiment metric SM_2_1 comprises a second primary sentiment type identifier ST_ID_2_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary methods, the primary set of sentiment type identifiers ST_ID_SET_1 is given by:

ST_ID_SET_1={1,2,3,4,5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:
ST_ID_SET_1={"Very negative", "Negative", "Neutral", "Positive", "Very positive"},
e.g. where "Very negative" and/or "Very positive" is optional.

In one or more exemplary methods, the primary set of sentiment type identifiers ST_ID_SET_1 is given by:

ST_ID_SET_1={1,2,3,4,5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_2_i. For example, the second primary sentiment metric SM_2_1 may comprise a second primary sentiment type identifier ST_ID_2_1 indicative of or corresponding to the primary sentiment state or the second speaker state being "positive".

A second sentiment metric SM_2_i may comprise a sentiment level, also denoted SL_2_i, i=1, 2, . . . , C, where C is the number of sentiment levels. In other words, determining SM_2_i may comprise determining SL_2_i, e.g. determining SM_2_1 may comprise determining a second primary sentiment level SL_2_1. A sentiment level SL_2_i may indicate a level of the i'th sentiment type. In other words, SL_2_i may indicate a degree of the i'th sentiment type. For example, when ST_ID_2_1 corresponds to the second speaker state "positive", a second primary sentiment level SL_2_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A second sentiment metric SM_2_i may comprise a confidence score, respectively denoted SCS_2_i, i=1, 2, . . . , C, where C is the number of confidence scores. In other words, determining SM_2_i may comprise determining a second confidence score SCS_2_i, e.g. determining second primary sentiment metric SM_2_1 may comprise determining a second primary confidence score SCS_2_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_2_1=0.88 may be indicative of a probability of 88% that the determined ST_ID_2_1, e.g. being "positive", is correct.

Determining one or more second sentiment metrics indicative of a second speaker state may comprise extracting one or more speaker features from the second audio signal, e.g. wherein the one or more second sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

A linguistic feature may comprise specific sentiment related words such as positive and/or negative words. The linguistic feature may be determined based on a text transcript of the audio signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary methods, the one or more first sentiment metrics may be determined based on a machine learning, ML, model, such as an output of a ML model. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100,000 parameters to 1,000,000 parameters, e.g. 500,000 to 1,000,000 parameters. A ML model may comprise layers in the range of 5 layers to 20 layers, e.g. 10 layers to 15 layers.

A ML model may be trained based on e.g. recording of calls, where a validator or supervisor, such as a human supervisor, have assigned sentiment identifiers/labels for a sentiment metric, and/or speaker feature labels for a speaker feature. A speaker feature may be determined algorithmically via signal processing algorithms. The one or more first sentiment metrics may be inferred by the ML model. An input to the ML model may comprise one or more of an acoustic features, such as a tone feature. A tone feature may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. log Mel-Spec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer.

In one or more exemplary methods, the one or more second sentiment metrics SM_2_$i$ includes a second secondary sentiment metric also denoted SM_2_2, indicative of a secondary sentiment state of the second speaker. For the description of the second secondary sentiment metric SM_2_2 of the second speaker, it is referred back to the description of the first secondary sentiment metric SM_1_2 of the first speaker. The description of the first secondary sentiment metric SM_1_2 of the first speaker may also apply to the description of the secondary sentiment metric SM_2_2.

In one or more exemplary methods, the second speaker metric data comprises second tertiary speaker metric data being appearance metric data. Determining second speaker metric data SPMD_2 may comprise determining second tertiary speaker metric data, also denoted SPMD_2_3. In other words, the second speaker metric data SPMD_2 may comprise second tertiary speaker metric data SPMD_2_3. Determining second tertiary speaker metric data SPMD_2_3 may comprise determining appearance metric data, also denoted AMD.

In one or more exemplary methods, determining second tertiary speaker metric data SPMD_2_3 may comprise obtaining one or more second appearance metrics, also denoted AM_2_$i$, i=1, 2, . . . D, where D is the number of second appearance metrics of or associated with the second speaker. Obtaining one or more second appearance metrics may comprise determining one or more second appearance metrics. In other words, the appearance metric data AMD may comprise one or more second appearance metrics over time, e.g. over the first conversation. In one or more exemplary methods, the second avatar is based on the second tertiary speaker metric data.

An appearance metric is indicative of an appearance of a speaker. Appearance metric data AMD may be indicative of a mean appearance of a speaker over a conversation. An appearance metric may comprise one or more of an appearance identifier, appearance level(s), and a confidence score, and may be indicative of an appearance of the second speaker, e.g. based on the first audio signal and/or a second audio signal. Obtaining one or more second appearance metrics may comprise retrieving second appearance metric(s) from a database, e.g. based on information related to the second speaker stored in the database. When the second speaker is a user/agent of the system, obtaining one or more second appearance metrics may comprise retrieving second appearance metric(s) from an employee database, e.g. comprising information related to the appearance of the employees. Alternatively or additionally, the second speaker, e.g. being an agent, may pick or choose one or more second primary features and/or one or more second speaker representations himself/herself, such as from a database of second primary features and/or of second speaker representations. The one or more second appearance metrics AM_2_$i$ may comprise one or more parameters indicative of the appearance of the second speaker. The one or more second appearance metrics AM_2_$i$ include a second primary appearance metric, also denoted AM_2_1, indicative of a primary appearance of the second speaker and/or a second secondary appearance metric, also denoted AM_2_2, indicative of a secondary appearance of the second speaker.

In other words, AM_2_1 may be indicative of a primary physical appearance of the second speaker. AM_2_1 may be selected from a gender metric, a weight metric, a height metric, an age metric, a language metric, a language capability metric, a hearing capability metric, a dialect metric, a health metric (e.g. respiratory condition, speech deficiency, and/or speaking impairment), a personality metric (e.g. extrovert or introvert person), and an understanding capability metric (e.g. based on age metric, health metric, and/or gender metric). The understanding capability metric may for be relevant when an old person have difficulties hearing a conversation, or a foreigner who's not comfortable in the spoken language. The understanding capability metric may provide an indication to the user e.g. that he/she shall speak slower and more articulated.

A second appearance metric AM_2_$i$ may comprise a second appearance identifier, also denoted A_ID_2_$i$, where i is an index of the i'th second appearance metric. A second appearance identifier may be indicative of one of a gender metric, a weight metric, a height metric, an age metric, a language metric, a language capability metric, a hearing capability metric, and an understanding capability metric. In other words, determining AM_2_$i$ may comprise determining A_ID_2_$i$, including a second primary appearance identifier A_ID_2_1 of a second primary appearance metric AM_2_1 and/or a second secondary appearance identifier A_ID_2_2 of a second secondary appearance metric AM_2_2.

An appearance identifier may for example be a label, a number or a value, such as an integer, corresponding to a specific appearance metric, appearance type and/or an appearance class. For example, A_ID_2_i may be chosen from a set of appearance types, e.g. including one or more of gender, height, weight, height, age, language, language capability, hearing capability, and understanding capability. The appearance metric identifier may be a label or a number that is mapped to and/or indicative of the type of appearance metric.

In one or more exemplary methods, the second primary appearance metric AM_2_1 comprises a second primary appearance identifier A_ID_2_1 optionally selected from a primary set of appearance identifiers A_ID_SET_1, where A_ID_SET_1 comprises a plurality of appearance identifiers, e.g. including at least three, four, five or more sentiment type identifiers. In one or more exemplary methods, the second primary appearance metric AM_2_1 is a gender metric, i.e. second primary metric identifier A_ID_2_1 is indicative of gender, e.g. A_ID_2_1="Gender" or A_ID_2_1=1 that can be mapped to gender via a table.

In one or more exemplary methods, the second secondary appearance metric AM_2_2 comprises a second secondary appearance identifier A_ID_2_2 optionally selected from a secondary set of appearance identifiers A_ID_SET_2, where A_ID_SET_2 comprises a plurality of appearance identifiers, e.g. including at least three, four, five or more appearance identifiers. In one or more exemplary methods, the second secondary appearance metric AM_2_2 is an age metric, i.e. second secondary metric identifier A_ID_2_2 is indicative of age, e.g. A_ID_2_2="Age" or A_ID_2_2=2 that can be mapped to age via a table.

A set of appearance identifiers may comprise two or at least three or at least four different appearance identifiers, such as five, six, seven, eight, nine, or more appearance identifiers. For example, the second primary appearance metric AM_2_1 may comprise a second primary appearance identifier A_ID_2_1 indicative of or corresponding to the primary appearance of the second speaker, e.g. one of gender, weight, height, age, language, language capability, hearing capability, and understanding capability. For example, a second secondary appearance identifier A_ID_2_2 may be indicative of or correspond to a second secondary appearance of the second speaker, e.g. one of gender, weight, height, age, language, language capability, hearing capability, and understanding capability. The second secondary appearance identifier is optionally different from the second primary appearance identifier.

A second appearance metric AM_2_i may comprise an appearance level, also denoted AL_2_i, i=1, 2, . . . , E, where E is the number of appearance levels. In other words, determining AM_2_i may comprise determining AL_2_i, e.g. determining AM_2_1 may comprise determining a second primary appearance level AM_2_1. The second appearance level AL_2_i may indicate a level, value, range, or label of the appearance metric AM_2_i as indicated by the appearance identifier A_ID_2_i. In other words, a second appearance level AL_2_i may indicate a level, value, range, or label of the second appearance metric AM_2_i. For example, when A_ID_2_1 corresponds to the second primary appearance of the second speaker being "gender", a second primary appearance level AL_2_1 may be indicative of or correspond to "male", "female" or optionally "unisex".

For example, when second secondary appearance identifier A_ID_2_2 corresponds to the second secondary appearance metric of the second speaker being "height", a second secondary appearance level AL_2_2 may be indicative of or correspond to "short", "medium" or "tall". For example, when second secondary appearance identifier A_ID_2_2 corresponds to the second secondary appearance of the second speaker being "height", a second secondary appearance level AL_2_2 may be indicative of or correspond to "less than 160 cm", "between 160 cm and 185 cm" or "taller than 185 cm".

For example, when a second appearance identifier, such as second tertiary appearance identifier A_ID_2_3, corresponds to a second appearance metric, such as second tertiary appearance metric AM_2_3, of the second speaker being "age", a second tertiary appearance level AL_2_3 may be indicative of or correspond to an age range such as "younger than 20 years", "20-40 years", "40-60 years", or "older than 60 years" or an age label, such as "young", "mid-aged" or "old".

A second appearance metric AM_2_i may comprise a confidence score, also denoted ACS_2_i, i=1, 2, . . . , G, where G is the number of confidence scores. In other words, determining a second appearance metric AM_2_i may comprise determining a second appearance confidence score ACS_2_i, e.g. determining a second primary appearance metric AM_2_1 may comprise determining a second primary appearance confidence score ACS_2_1. A second appearance confidence score ACS_2_i of an appearance metric AM_2_i may be indicative a score or a probability of the determined second appearance metric AM_2_i, such as second appearance level AL_2_i, being correct, e.g. the appearance metric or appearance level being correct. For example, ACS_2_1=0.95 may be indicative of a probability of 95% that a determined AL_2_1 being "male" is correct.

Determining one or more second appearance metrics indicative of a second speaker may comprise extracting one or more speaker appearance features from the second audio signal. The one or more speaker appearance features may for example comprise a speaker tone feature, a speaker intonation feature, a speaker power feature, a speaker pitch feature and/or a speaker frequency feature.

The one or more second sentiment metrics and the one or more second appearance metrics may be part of second speaker metric data. Second speaker metric data may also be denoted agent metric data and/or caller metric data.

In one or more exemplary methods, the one or more second appearance metrics AM_2_i includes a second secondary appearance metric also denoted AM_2_2, indicative of a secondary appearance of the second speaker. For the description of the second secondary appearance metric AM_2_2 of the second speaker, it is referred back to the description of the first secondary appearance metric AM_1_2 of the first speaker. The description of the first secondary appearance metric AM_1_2 of the first speaker may also apply to the description of the secondary appearance metric AM_2_2.

In one or more exemplary methods, determining the first post-conversation representation PCR_1 comprises determining a second primary speaker representation SR_2_1 based on the second primary speaker metric data SPMD_2_1. In one or more exemplary methods, the method comprises including the second primary speaker representation SR_2_1 in the first post-conversation representation PCR_1. In other words, the method comprises including the second primary speaker representation SR_2_1 in the first post-conversation representation PCR_1. In one or more exemplary methods, the second primary speaker representation SR_2_1 comprises a second avatar based on the second primary speaker metric data SPMD_2_1. In one or more exemplary methods, the second primary speaker representation SR_2_1 is based on the second tertiary speaker metric data SPMD_2_3.

In other words, the method comprises determining the second primary speaker representation SR_2_1, based on the second primary sentiment metric SM_2_1 and/or the second appearance metric AM_2_1.

The second speaker representation SR_2 may comprise a second primary speaker representation, also denoted SR_2_1. Determining SR_2_1 may comprise generating the second primary speaker representation SR_2_1 based on SM_2_1 and AM_2_1.

The second speaker representation SR_2 may comprise a second secondary speaker representation, also denoted SR_2_2. The second speaker representation SR_2 may comprise a second tertiary speaker representation, also denoted SR_2_3. The second speaker representation SR_2 may comprise a second quaternary speaker representation, also denoted SR_2_4. The second speaker representation SR_2 may comprise a second quinary speaker representation, also denoted SR_2_5. Thus, determining a second speaker representation may comprise determining one or more of SR_2_2, SR_2_3, SR_2_4, and SR_2_5 based on the second audio signal, such as based on the second primary sentiment metric SM_2_1, the second primary tone metric TM_2_1, and/or the second primary appearance metric AM_2_1. Determining a second speaker representation may comprise determining one or more of SR_2_2, SR_2_3, SR_2_4, and SR_2_5 based on the second audio signal, such as based on the second primary sentiment metric SM_2_1, the second primary tone metric TM_2_1, and/or the second primary appearance metric AM_2_1.

The second speaker representation may also be denoted a second person representation of the first conversation or during the first conversation, e.g. a last conversation or call.

The second primary speaker representation may be indicative of the second speaker state and/or the appearance of the second speaker during the first conversation, e.g. of a last call between an agent and a caller.

In other words, the second speaker representation, such as the second primary speaker representation, may be a mean speaker representation, e.g. comprising a mean second avatar, of the second speaker during the first conversation, such as a telephone call, between the second speaker and second speaker. The second speaker representation may be indicative of or reflect a mean, average, and/or median sentiment, tone, and/or appearance of the second speaker. For example, the second speaker representation, such as the second primary speaker representation SR_2_1 may be an average physical and emotional representation of the second speaker.

An advantage of having a post-conversation representation, e.g. after a conversation may be that the user of the electronic device may see or be informed right after a conversation, such as call, about his/her performance or the outcome of the conversation in relation to the sentiment, the tone, and/or the second speaker appearance. Furthermore, the user of the electronic device may get a better feedback on his/her performance or on the outcome of the conversation. The post-conversation representation may provide a gamification of the users' performances. The post-conversation representation may for example increase the engagement of a user in his/her work, e.g. by being able to visualize an improvement of performances. The second speaker representation may provide a personification of the second speaker, a portrait of the second speaker, a shape of the second speaker, a sketch of the second speaker, and/or a gamification of the second speaker.

The second speaker representation may comprise sound representations, such as auditory feedback and/or audio icons.

In one or more exemplary methods, the method comprises determining the second speaker representation SR_2, such as determining a second primary speaker representation SR_2_1 of the second speaker representation SR_2, comprises determining one or more second features F_2_i, i=1, . . . , J, where J is the number of second features. The one or more second features may include a second primary feature also denoted F_2_1 and/or a second secondary feature also denoted F_2_2 of the second primary speaker representation SR_2_1. The number L of second features may be 2, 3, 4, 5, or more. The second primary speaker representation S_2_1 may be or comprise a second avatar, a second emoji, a second smiley, a second icon, a second image In one or more exemplary methods, determining the second speaker representation SR_2 comprises determining a second primary feature, also denoted F_2_1, and/or a second secondary feature, also denoted F_2_2, of a second avatar based on the second primary sentiment metric SM_2_1 and/or based on the second primary appearance metric AM_2_1. Optionally, the second speaker representation, such as a second primary speaker representation SR_2_1 of the second speaker representation SR_2, comprises the second avatar. Determining SR_2, such as determining SR_2_1, may comprise determining one or more features, such as second features, based on one or more sentiment metrics, such as second sentiment metrics. Determining SR_2, such as determining SR_2_1, may comprise determining one or more features, such as second features, based on one or more sentiment metrics, such as second sentiment metrics and/or one or more appearance metrics. Determining SR_2, such as determining SR_2_1, may comprise determining F_2_1 based on SM_2_1 and/or AM_2_1. In other words, the second speaker representation SR_2, such as the second primary speaker representation SR_2_1, may be based on one or more second features, e.g. based on F_2_1 and F_2_2.

The second primary feature F_2_1 may be indicative of the second primary sentiment metric SM_2_1. In other words, F_2_1 may be indicative of the primary sentiment state indicated by SM_2_1. For example, when the primary sentiment state indicated by SM_2_1 is negative, F_2_1 may be indicative of a negative feature, e.g. negative eyes or negative mouth.

F_2_1 may be selected from a list of features and/or a class of features. F_2_1 may be selected or chosen from a set of features, e.g. a set of feature types and a number or value may be assigned to each feature type of the set of feature types.

The second primary representation, such as the second avatar, may be indicative of the primary sentiment state of the second speaker. The second avatar may be a real-time physical and/or emotional representation of the second speaker. The second avatar may be a representation of a facial expression being indicative of the sentiment state of the speaker and/or the appearance of the second speaker. The term representation may be understood as one or more of an avatar, a smiley, an emoji, an emoticon, a portrait, a personification, a sketch, and a shape. The second primary representation, such as the second avatar, may be a sum of one or more second features representing one or more sentiments or sentiment states of the second speaker and/or one or more appearances of the second speaker. The second primary representation, such as the second avatar may at least comprise one feature, at least two features, at least five features, at least ten features.

In one or more exemplary methods, outputting the first post-conversation representation may comprise outputting, via the interface of the electronic device, the second speaker representation SR_2. Outputting the first post-conversation representation PCR_1 may comprise displaying a second user interface indicative of the post-conversation representation. In one or more exemplary methods, outputting the first post-conversation representation PCR_1 may comprise outputting, via the interface of the electronic device, one or more of the second primary speaker representation SR_2_1, the second secondary speaker representation SR_2_2, the second tertiary speaker representation SR_3_3, and the second quaternary speaker representation SR_1_4.

Outputting the second speaker representation SR_2 may comprise displaying a second user interface indicative of the second speaker representation.

A user interface may comprise one or more, such as a plurality of, user interface objects. For example, the second user interface may comprise one or more second user interface objects, such as a second primary user interface object and/or a second secondary user interface object. A user interface object may refer herein to a graphical representation of an object that is displayed on an interface of the electronic device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user.

In one or more exemplary methods, the second speaker metric data comprises second secondary speaker metric data, also denoted SPMD_2_2. Determining second secondary speaker metric data SPMD_2_2 may comprise determining one or more second secondary speaker metrics SM_2_2 over time, e.g. over the first conversation. In other words, the second speaker metric data SPMD_1 may comprise second secondary speaker metric data SPMD_2_2.

In one or more exemplary methods, the method comprises determining a second secondary speaker representation SR_2_2 based on the second secondary speaker metric data SPMD_2_2 and including the second secondary speaker representation SR_2_2 in the first post-conversation representation PCR_1. The second secondary speaker representation is optionally based on the second audio signal for the second speaker and may be a secondary speaker representation, e.g. as described in relation to the first secondary speaker representation. In other words, the description of the first secondary speaker representation may also apply to the second secondary speaker representation.

In one or more exemplary methods, the second secondary speaker representation SR_2_2 is based on historic second secondary speaker metric data SPMD_2_2.

In one or more exemplary methods, the second secondary speaker representation SR_2_2 comprises a representation of a number X of historic conversations, e.g. before the first conversation or including the first conversation, based on the second secondary speaker metric data. For example, X is a number of past or historic conversations, such as X=5 the second secondary speaker representation SR_2_2 comprises a representation of the last five conversations of the second speaker, such as the last five calls of an agent and/or a caller.

The second secondary speaker representation SR_2_2 may comprise a representation indicating that the first conversation, e.g. the last conversation, has been the best conversation of the day, the best conversation of the week, the best conversation of the month, and/or the best conversation of the year for the second speaker (e.g. caller and/or agent). In other words, the second secondary speaker representation SR_2_2 may comprise a representation indicating that the first conversation has been the conversation where the second speaker (e.g. caller and/or agent) have had the best performance, e.g. the best conversation score, within a certain period.

In one or more exemplary methods, the second secondary speaker metric data SPMD_2_2 is tone metric data, also denoted TMD. Determining second secondary speaker metric data SPMD_2_2 may comprise determining tone metric data. In one or more exemplary methods, determining second secondary speaker metric data SPMD_2_2 may comprise determining one or more second tone metrics, also denoted $TM\_2\_i$, i=1, 2, . . . , m, where m is the number of second tone metrics. In other words, the tone metric data TMD may comprise one or more second tone metrics over time, e.g. over the first conversation.

A tone metric is indicative of a tone of a speaker. Tone metric data TMD may be indicative of a mean tone of a speaker over a conversation. Tone metric data TMD may comprise one or more speech metrics. In other words, the tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more metrics.

In one or more exemplary methods, the second speaker representation is an agent representation. The agent representation may be a representation of an agent answering calls at a call center, such as a support call center.

An electronic device is disclosed. The electronic device comprises a processor, a memory, and an interface. The electronic device, such as the processor, is configured to perform any of the methods according to this disclosure.

An electronic device is disclosed. The electronic device comprising a processor, a memory, and an interface. The processor is configured to obtain one or more audio signals including a first audio signal during a first conversation.

The electronic device may for example comprise one or more of a mobile phone, a computer, and a tablet. The electronic device may for example be a user device, such as a mobile phone or a computer, configured to perform a call between a user and another person. The electronic device may be configured to obtain first audio input, such as first audio input from the call between the user and another person. For example, the electronic device may act as call agent device where the user may be an agent, such as an agent of a call center, such as a support call center, an after sales call center, a marketing call center, or a sales call center. The electronic device may for example be a user device, such as a mobile phone or a computer, configured to record first audio input from a first speaker, such as record the first speaker speaking or talking. The electronic device may be configured to obtain one or more audio signals, such as generate one or more audio signals, including a first audio signal. The first audio signal may be based on the first audio input.

The electronic device, such as using the processor, is configured to determine first speaker metric data of a first speaker based on the first audio signal. The first speaker metric data includes first primary speaker metric data. The electronic device, such as using the processor, is configured to determine a termination of the first conversation. The electronic device, such as using the processor, is in accordance with a detection of the termination of the first conversation, configured to determine a first post-conversation representation based on the first speaker metric data. The electronic device, such as using the processor, is configured to output, via the interface, the first post-conversation representation.

The interface of the electronic device may comprise a first display. Optionally, the system may comprise a second interface, such as a second display (e.g. a sidewing), being separate from the electronic device. The second interface may act as a display instead of the interface of the electronic device. The first display of the electronic device may be configured to detect a user input, such as a first primary user input. The user input may comprise a touch input from the user, for example when the first display comprises a touch-sensitive display. The user input may comprise a contact on the touch sensitive display and/or a keyboard comprised in or connected to the electronic device. A touch-sensitive display may provide a first user interface and/or a second user interface (such as an input interface) and an output interface between the electronic device and the user.

The processor of the electronic device may be configured to receive and/or send electrical signals from/to touch-sensitive display. A touch-sensitive display may be configured to display visual output to the user, e.g. the first speaker representation and/or the second speaker representation. The visual output optionally includes graphics, text, icons, video, audio icons, and any combination thereof (collectively termed "graphics"). For example, some, most, or all of the visual output may be seen as corresponding to user-interface objects. The electronic device may also be configured to output first speaker representations comprising audio output, such as sound representations, audio icons, and/or auditory feedback.

The processor of the electronic device may be configured to display, on the interface, e.g. first display, one or more user interfaces, such as user interface screens, including a first user interface and/or a second user interface. A user interface may comprise one or more, such as a plurality of user interface objects. For example, the first user interface may comprise a first primary user interface object and/or a first secondary user interface object. A second user interface may comprise a second primary user interface object and/or a second secondary user interface object. A user interface may be referred to as a user interface screen.

An input, such as the user input, may comprise a touch (e.g. a tap, a force touch, a long press), a click (such as a mouse click), a typing (such as a typing on a keyboard), an audio input (such as a voice assistant), and/or a movement of contact (e.g. a swipe gesture, e.g. for toggling). The movement on contact may be detected by a touch sensitive surface, e.g. on the first display of the electronic device. Thus, the first display may be a touch sensitive display. The first input (such as first user input) may comprise a lift off. A user input, such as the first primary user input, the second primary user input and/or the second secondary user input, may comprise a touch and a movement followed by a lift off.

A system is disclosed. The system comprises a server device and an electronic device. The electronic device is an electronic device according to this disclosure.

The system may be a system for monitoring, handling, and/or analysing one or more audio signals, such as a speaker talking, e.g. as a monologue. The system may be a system for monitoring, handling, and/or analysing one or more audio signals, such as a conversation, e.g. between two or more people, such as a conversation in a phone call or a meeting. The system may for example comprise or act as a call center system for monitoring, handling, and/or analysing one or more audio signals, such as conversations between two or more people, e.g. a phone call between an agent of the call center system and a customer or caller.

It is to be understood that a description of a feature in relation to method(s) is also applicable to the corresponding feature in the electronic device, server device, and/or system.

FIG. 1 schematically illustrates an exemplary system, such as system 2, with post-conversation representation according to the present disclosure. The system 2 comprises an electronic device 10 and optionally a server device 20. The electronic device 10 comprises a memory 10A, one or more interfaces 10B, and a processor 10C. The server device 20 comprises a memory 20A, one or more interfaces 20B, and one or more processors 20C. A user 1A may use the electronic device 10, e.g. being a mobile phone or a computer, for performing or receiving a call from a speaker 1B, e.g. a first speaker. The speaker 1B may use a speaker electronic device 30 for communicating with the user 1A.

The electronic device 10 may be configured to act as a user device that the user 1A may use for communicating and/or monitoring a call/conversation with the speaker 1B. The electronic device/processor 10C is configured to obtain 14 one or more audio signals including a first audio signal. The first audio signal may be obtained 22 from the speaker electronic device 30, e.g. via a network 40 such as a global network, e.g. the internet or a telecommunications network. The first audio signal may be obtained 14 from the server device 20, e.g. via the network 40 such as a global network, e.g. the internet or a telecommunications network.

The speaker electronic device 30 may be configured to record audio input 32, such as first audio input, from the speaker 1B, such as record the speaker 1B speaking or talking. The speaker electronic device 30 may be configured to obtain one or more audio signals, such as generate one or more audio signals based on the audio input 32, including a first audio signal based on the first audio input. The speaker electronic device 30 may be configured to transmit 22 the first audio signal to the electronic device 10, e.g. via the network 40. The speaker electronic device 30 may be configured to obtain 24 one or more audio signals from the electronic device 10, e.g. based on user input 4, such as user audio input. The user input 4 may be the user 1A speaking or talking, e.g. the electronic device 10 recording the user 1A speaking or talking. The user 1A may be the first speaker and/or a second speaker.

The electronic device/processor 10C is configured to determine first speaker metric data of a first speaker based on the first audio signal.

The first speaker metric data includes first primary speaker metric data indicative of the first speaker 1B.

Optionally, the one or more processors 20C are configured to determine first speaker metric data of a first speaker based on the first audio signal. The processor 10C may then be configured to obtain 14 the first speaker metric data from the server device 20, e.g. via the network 40. The processor 20C may be configured to transmit 18 the first speaker metric data to the electronic device 10, e.g. via the network 40. The processor 20C may be configured to transmit 18 the first speaker metric data/second speaker metric data, to the electronic device 10, e.g. via the network 40.

The processor 10C is optionally configured to determine first secondary speaker metric data, e.g. being tone metric data of the first speaker 1B. The first secondary speaker metric data may include tone metric data indicative of a tone of the speaker 1B.

Optionally, the processor 20C is configured to determine first secondary speaker metric data. The processor 100 may then be configured to obtain 14 the first secondary speaker metric data, from the server device 20, e.g. via the network 40. The processor 20C may be configured to transmit 18 the first secondary speaker metric data to the electronic device 10, e.g. via the network 40.

The processor 10C is optionally configured to determine first tertiary speaker metric data, e.g. being indicative of an appearance of the first speaker 1B. The first tertiary speaker metric data may include a first primary appearance metric indicative of a primary appearance of the speaker 1B.

Optionally, the processor 20C is configured to determine first tertiary speaker metric data. The processor 10C may then be configured to obtain 14 the first tertiary speaker metric data, from the server device 20, e.g. via the network 40. The processor 20C may be configured to transmit 18 the first tertiary speaker metric data to the electronic device 10, e.g. via the network 40.

The processor 10C is configured to detect a termination of the first conversation, e.g. a termination of speech, such as a termination, an end, or a hold of a call, and in accordance with the detection of the termination of the first conversation/speech/call, to determine a first post-conversation representation based on the first speaker metric data. The processor 10C may be configured to output 6, via the interface 10B, the first post-conversation representation.

The processor 10C may in accordance with detecting the termination of the first conversation, be configured to determine first conversation data based on the first speaker metric data. The processors 10C may be configured to transmit the first conversation data to the server device 20 of the system 2.

The processor 10C may in accordance with detecting the termination of the first conversation, be configured to store the first conversation data, such as a speaker record, in the memory 10A. In one or more exemplary electronic devices and/or methods, the first conversation data comprises a first speaker record indicative of one or more of first speaker metric data, e.g. first primary speaker metric data, first secondary speaker metric data, and/or first tertiary speaker metric data.

Optionally, the processor 20C is configured to determine the first post-conversation representation based on the first speaker metric data. The processor 100 may then be configured to obtain 14 the first post-conversation representation from the server device 20, e.g. via the network 40. The processor 20C may be configured to transmit 18 the first post-conversation representation, to the electronic device 10, e.g. via the network 40.

Figure 2A:
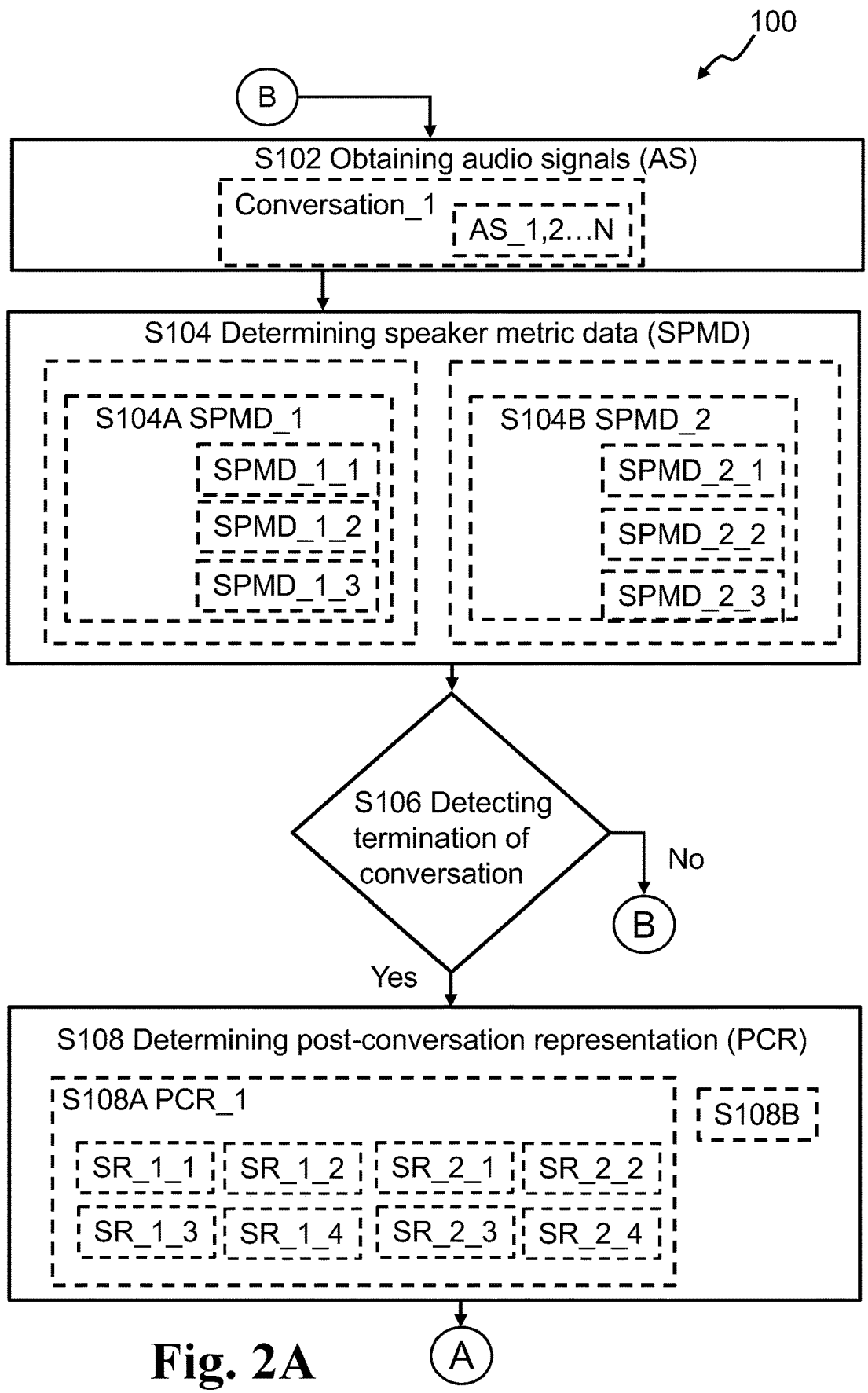
FIGS. 2A-B are flow diagrams of an exemplary method according to the present disclosure, FIG. 3 schematically illustrates an exemplary electronic device according to the present disclosure, FIG. 4 schematically illustrates an exemplary system comprising a server device and an electronic device according to the present disclosure, and FIG. 5. schematically illustrates an exemplary data structure according to the present disclosure.
Figure 2B:
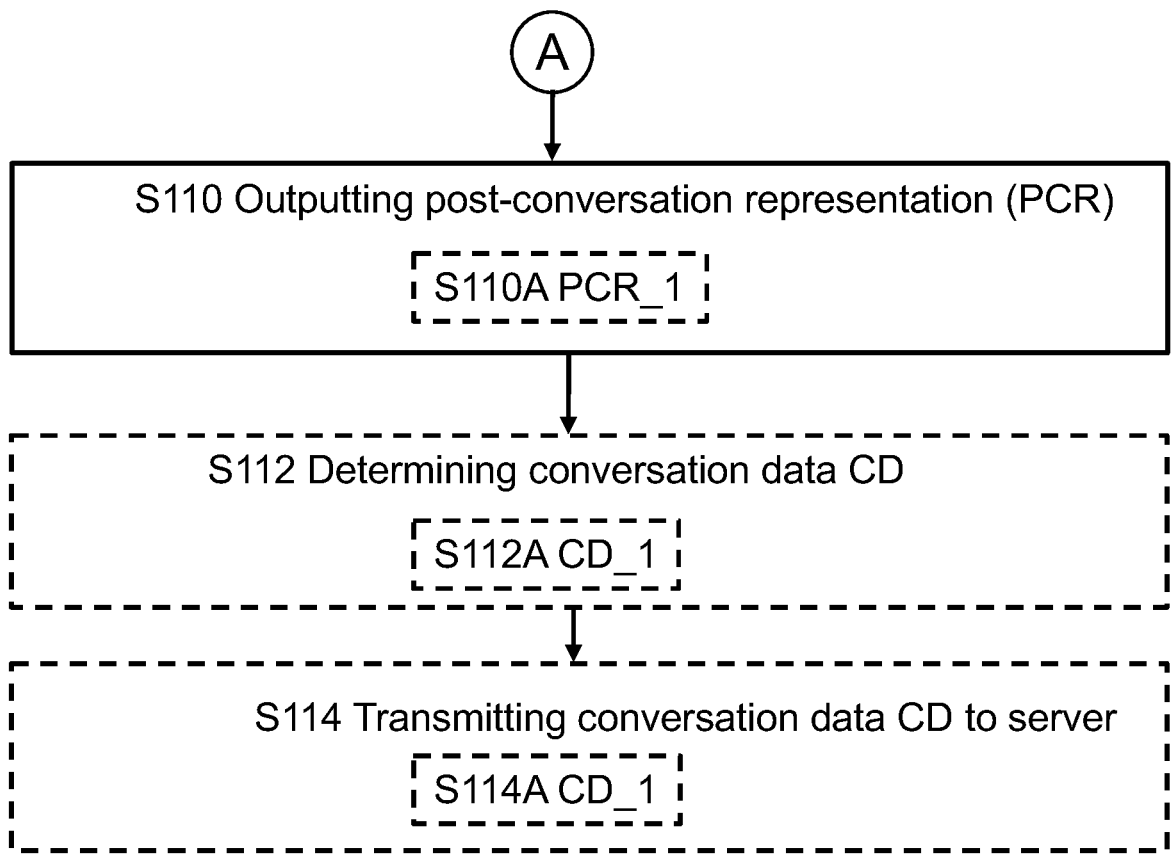

The electronic device 10 may be configured to perform any of the methods disclosed in FIGS. 2A, 2B.

The processor 10C is optionally configured to perform any of the operations disclosed in FIGS. 2A-2B (such as any one or more of S104A, S104B, S108A, S108B, S110A, S112, S112A, S114, S114A). The operations of the electronic device may be embodied in the form of executable logic routines (for example, lines of code, software programs, etc.) that are stored on a non-transitory computer readable medium (for example, memory 10A) and are executed by the processor 10C).

The processor 20C is optionally configured to perform any of the operations disclosed in FIGS. 2A-2B (such as any one or more of S104A, S104B, S108A, S108B, S110A, S112, S112A, S114, S114A). The operations of the server device may be embodied in the form of executable logic routines (for example, lines of code, software programs, etc.) that are stored on a non-transitory computer readable medium (for example, memory 20A) and are executed by the processor 20C).

Furthermore, the operations of the electronic device 10 may be considered a method that the electronic device 10 is configured to carry out. Also, while the described functions and operations may be implemented in software, such functionality may as well be carried out via dedicated hardware or firmware, or some combination of hardware, firmware and/or software.

FIGS. 2A and 2B show a flow diagram of an exemplary method. A method 100 of operating a system comprising an electronic device is disclosed. The electronic device comprises an interface, a processor, and a memory. The method 100 comprises obtaining S102 one or more audio signals including a first audio signal AS_1 of a first conversation, e.g. of a first speaker, and optionally a second audio signal AS_2, of the first conversation of a second speaker. The method 100 comprises determining S104 speaker metric data SPMD based on one or more audio signals AS. Determining S104 speaker metric data may comprise determining S104A first speaker metric data SPMD_1 of a first speaker, and optionally determining S104B second speaker metric data SPMD_2 of a second speaker, e.g. based on AS_1 and/or AS_2.

The method 100 comprises determining S106 detecting a termination of the first conversation. In one or more exemplary methods, when termination of the first conversation is not detected, the method comprises reiterating/restarting B the method 100.

The method 100 comprises determining S108 a post-conversation representation PCR based on the speaker metric data SPMD. Determining S108 a post-conversation representation PCR may comprise determining S108A a first post-conversation representation PCR_1 based on the first speaker metric data and/or the second speaker metric data. Determining S108A a first post-conversation representation PCR_1 may comprise determining a first primary speaker representation SR_1_1 based on the first primary speaker metric data. Determining S108A a first post-conversation representation PCR_1 may comprise including S108B the first primary speaker representation SR_1_1 in the first post-conversation representation PCR_1. Determining S108A a first post-conversation representation PCR_1 may comprise determining a first secondary speaker representation SR_1_2 based on the first speaker metric data SPMD_1. Determining S108A a first post-conversation representation PCR_1 may comprise including S108B the first secondary speaker representation SR_1_2 in the first post-conversation representation PCR_1.

Determining S108A a first post-conversation representation PCR_1 may comprise determining a first tertiary speaker representation SR_1_3 based on the first speaker metric data SPMD_1. Determining S108A a first post-conversation representation PCR_1 may comprise including S108B the first tertiary speaker representation SR_1_3 in the first post-conversation representation PCR_1.

Determining S108A a first post-conversation representation PCR_1 may comprise determining a first quaternary speaker representation SR_1_4 based on the first speaker metric data SPMD_1. Determining S108A a first post-conversation representation PCR_1 may comprise including S108B the first quaternary speaker representation SR_1_4 in the first post-conversation representation PCR_1.

Determining S108A a first post-conversation representation PCR_1 may comprise determining a second primary speaker representation SR_2_1 based on the second speaker metric data SPMD_1. Determining S108A a first post-conversation representation PCR_1 may comprise including S108B the second primary speaker representation SR_2_1 in the first post-conversation representation PCR_1.

The method 100 comprises outputting S110 via the interface of the electronic device, one or more post-conversation representations PCR. Outputting S110 one or more post-conversation PCR representations may comprise outputting S110A a first post-conversation representation PCR_1, e.g. comprising a first primary speaker representation, a first secondary speaker representation, a first tertiary speaker representation, a first quaternary speaker representation, and/or a second primary speaker representation.

In one or more exemplary methods, the method 100 comprises in accordance with detecting S106 the termination of conversation, determining S112 conversation data CD based on the speaker metric data SPMD. In one or more exemplary methods, the method 100 comprises in accordance with detecting S106 the termination of the first conversation, determining S112A first conversation data CD_1 based on the first speaker metric data SPMD_1.

In one or more exemplary methods, the method 100 comprises transmitting S114 the conversation data CD to the server device. In one or more exemplary methods, the method 100 comprises transmitting S114 the first conversation data CD_1 to the server device.

Figure 3:
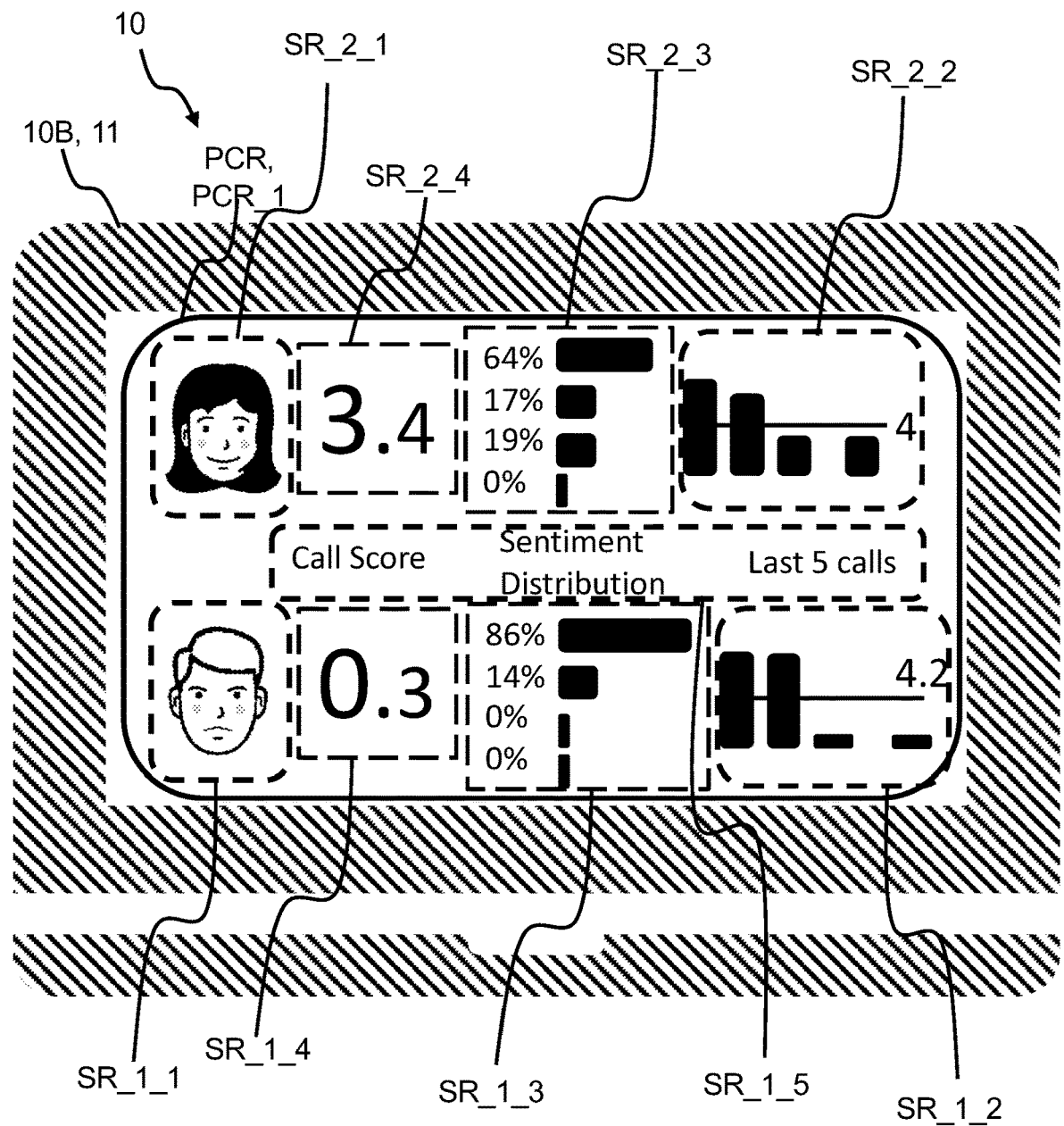

FIG. 3 schematically illustrates an exemplary electronic device, such as electronic device 10, according to the present disclosure. The electronic device 10 is in this example a laptop computer. The electronic device 10 may for example be an electronic device used by a user (e.g. a second speaker), such as an agent of call center or support call center. The electronic device 10 is configured to display on an interface 10B of the electronic device, e.g. on a display 11 of the laptop computer, a user interface comprising a post-conversation representation PCR. The user interface comprises a plurality of user interface objects. The electronic device 10 displays a first post-conversation representation PCR_1 as a first user interface object PCR_1, e.g. having a first display region. The user of the electronic device 10, e.g. being the second speaker may visualize the post-conversation representation PCR_1 on his/her electronic device 10 after the first conversation. The post-conversation representation PCR_1 may provide feedback to the user, e.g. second speaker/agent, about the first conversation, the last conversation, and/or historic conversations of the second speaker and/or the first speaker (being a caller or a customer). The first post-conversation representation PCR_1 comprises a first primary speaker representation SR_1_1, e.g. arranged in a first primary display region. The first primary speaker representation SR_1_1 is based on a first audio signal AS_1 of a first conversation. The first primary speaker representation SR_1_1 is based on the determined first speaker metric data SPMD_1, e.g. based on the first primary speaker metric data SPMD_1_1, the first secondary speaker metric data SPMD_1_2, 2, and/or the first tertiary speaker metric data SPMD_1_3. The first primary speaker representation SR_1_1 may be based on sentiment metric data, tone metric data, and/or appearance metric data, such as a determined first primary sentiment metric SM_1_1, a determined first primary tone metric TM_1_1, and/or a determined first primary appearance metric AM_1_1 of a first speaker.

Determining the first primary speaker representation SR_1_1 may be based on determining the first primary sentiment metric SM_1_1 indicative of a first speaker state, e.g. selecting the first sentiment metric out of five different of sentiment metrics to be indicative of the first speaker state being negative. Determining the first primary speaker representation SR_1_1 may be based on determining the first primary appearance metric AM_1_1 indicative of a primary appearance of the first speaker, e.g. selecting the first primary appearance metric out of two different appearance metrics to be indicative of the primary appearance being of the gender male. Thus, determining the first primary speaker representation SR_1_1 as being a negative male, e.g. determining a first avatar being a negative male. Determining the first primary speaker representation SR_1_1 may comprise determining a first primary feature of the first avatar based on the first primary speaker metric data, e.g. based on the first primary sentiment metric. For example, the first primary sentiment metric being negative, the first primary feature, e.g. being an eye feature, may be selected out of five different type of eyes to be negative male eyes. For example, the first primary sentiment metric being negative, a first secondary feature, e.g. being a mouth feature, may be selected out four different type of mouths to be negative male mouth.

The first post-conversation representation PCR_1 comprises a second primary speaker representation SR_2_1, e.g. arranged in a second primary display region. The second primary speaker representation SR_2_1 is based on determined second speaker metric data SPMD_2, e.g. comprising second primary speaker metric data SPMD_2_1, second secondary speaker metric data SPMD_2_2, and/or second tertiary speaker metric data SPMD_2_3. The second primary speaker representation SR_2_1 may be based on sentiment metric data, tone metric data, and/or appearance metric data, such as a determined second primary sentiment metric SM_2_1 and/or a determined second primary appearance metric AM_2_1 of a second speaker.

The second primary speaker representation SR_2_1 is based on a second audio signal AS_2, e.g. of the first conversation. The second primary speaker representation SR_2_1 may be based on a determined second primary sentiment metric SM_2_1 and/or a determined second primary appearance metric AM_2_1 of a second speaker. Determining the second primary speaker representation SR_2_1 may be based on determining the second primary sentiment metric SM_2_1 indicative of a second speaker state, e.g. selecting the second sentiment metric out of four different of sentiment metrics to be indicative of the second speaker state being positive. Determining the second primary speaker representation SR_2_1 may be based on determining the second primary appearance metric AM_2_1 indicative of a primary appearance of the second speaker, e.g. selecting the second primary appearance metric out of two different appearance metrics to be indicative of the primary appearance being of the gender female. Thus, determining the second primary speaker representation SR_2_1 as being a positive female, e.g. determining a second avatar being a positive female. Determining the second primary speaker representation may comprise determining a second primary feature of the second avatar based on the second primary speaker metric data, e.g. based on the second primary sentiment metric. For example, the second primary sentiment metric being positive, the second primary feature, e.g. being an eye feature, may be selected out of five different type of eyes to be positive female eyes. For example, the second primary sentiment metric being positive, a second secondary feature, e.g. being a mouth feature, may be selected out four different type of mouths to be positive female mouth, e.g. a smiling avatar. The first primary speaker representation SR_1_1 and/or the second primary speaker representation SR_2_1 may be based on the first audio signal and the second audio signal. The first primary speaker representation SR_1_1 and/or the second primary speaker representation SR_2_1 may be determined as a comparison between the first audio signal and the second audio signal.

The first post-conversation representation PCR_1 comprises a first secondary speaker representation SR_1_2, e.g. arranged in a first secondary display region. The electronic device 10 displays the first secondary speaker representation SR_1_2 as a first secondary user interface object SR_1_2, e.g. having a first secondary display region.

The first secondary speaker representation SR_1_2 is based on historic first speaker metric data SPMD_1, e.g. based on historic first primary speaker metric data SPMD_1_1, historic first secondary speaker metric data SPMD_1_2, and/or historic first tertiary speaker metric data SPMD_1_3. The first secondary speaker representation SR_1_2 comprises a representation of historic conversations, such as historic calls. In other words, the first secondary speaker representation SR_1_2 comprises a representation of the last five conversations, e.g. before the first conversation or including the first conversation being the last conversation. The first secondary speaker representation SR_1_2 comprises a representation of the last five conversations of the first speaker, such as the "last five calls" of the first speaker. In FIG. 3, the first secondary speaker representation SR_1_2 comprises representations in the form of bars, where each bar is indicative of a call score of a call of the first speaker. The first secondary speaker representation SR_1_2 comprises a baseline being indicative of a mean value of the last five call scores. The baseline has a baseline value associated with the horizontal level of the baseline being indicative of the mean call score based on the last five calls. The baseline value has a value of 4.2, indicating that the mean call score determined based on the last five calls of the first speaker has been determined to be 4.2. The first bar (when starting from the left side of SR_1_2) indicates that the call associated with the first bar has a call score being above the base line, i.e. having a call score being above 4.2.

The second bar indicates that the call associated with the second bar has a call score being above the base line, i.e. having a call score being above 4.2. The third bar indicates that the call associated with the third bar has a call score being below the base line, i.e. having a call score being below 4.2. The fourth bar indicates that the call associated with the fourth bar has a call score being below the base line, i.e. having a call score being below 4.2. The fourth bar is not displayed, which indicates that the call associated with the fourth bar has a call score of 0. The fifth bar indicates that the call associated with the fifth bar has a call score being below the base line, i.e. having a call score being below 4.2. The fifth bar represents a bar representation of the call score displayed in the first quaternary speaker representation SR_1_4, the call score being 0.3.

Optionally (not shown in FIG. 3), the first secondary speaker representation SR_1_2 may comprise a representation indicating that the first conversation, e.g. the last conversation, has been the best conversation of the day, the best conversation of the week, the best conversation of the month, and/or the best conversation of the year for the first speaker (e.g. a caller and/or agent). In other words, the first secondary speaker representation SR_1_2 may comprise a representation indicating that the first conversation has been the conversation where the first speaker (e.g. caller and/or agent) have had the best performance, e.g. the best conversation score, within a certain period.

For example, when the last conversation has been the best of the day/week/month, the electronic device 10 may then display the first secondary speaker representation SR_1_2 as an animated first secondary user interface object SR_1_2, e.g. comprising fireworks animations, party animations, and/or popping bottle animation. The first secondary speaker representation SR_1_2 may also comprise a text indicating e.g. to the first speaker that the last conversation was the best conversation with the second speaker, e.g. that specific second speaker.

The first post-conversation representation PCR_1 may comprise a second secondary speaker representation SR_2_2, e.g. arranged in a second secondary display region. The electronic device 10 displays the second secondary speaker representation SR_2_2 as a second secondary user interface object SR_2_2, e.g. having a second secondary display region.

The second secondary speaker representation SR_2_2 is based on historic second speaker metric data SPMD_2, e.g. based on historic second primary speaker metric data SPMD_2_1, historic second secondary speaker metric data SPMD_2_2, and/or historic second tertiary speaker metric data SPMD_2_3. The second secondary speaker representation SR_2_2 comprises a representation of historic conversations, such as historic calls. In other words, the second secondary speaker representation SR_2_2 comprises a representation of the last five conversations, e.g. before the first conversation or including the first conversation being the last conversation. The second secondary speaker representation SR_2_2 comprises a representation of the last five conversations of the second speaker, such as the "last five calls" of the second speaker. In FIG. 3, the second secondary speaker representation SR_2_2 comprises representations in the form of bars, where each bar is indicative of a call score of a call of the second speaker. The second secondary speaker representation SR_2_2 comprises a baseline being indicative of a mean value of the last five call scores. The baseline has a baseline value associated with the horizontal level of the baseline being indicative of the mean call score based on the last five calls. The baseline value has a value of 4, indicating that the mean call score determined based on the last five calls of the second speaker has been determined to be 4. The first bar (when starting from the left side of SR_2_2) indicates that the call associated with the first bar has a call score being above the base line, i.e. having a call score being above 4. The second bar indicates that the call associated with the second bar has a call score being above the base line, i.e. having a call score being above 4. The third bar indicates that the call associated with the third bar has a call score being below the base line, i.e. having a call score being below 4. The fourth bar indicates that the call associated with the fourth bar has a call score being below the base line, i.e. having a call score being below 4. The fourth bar is not displayed, which indicates that the call associated with the fourth bar has a call score of 0. The fifth bar indicates that the call associated with the fifth bar has a call score being below the base line, i.e. having a call score being below 4. The fifth bar represents a bar representation of the call score displayed in the second quaternary speaker representation SR_2_4, the call score being 3.4.

Optionally (not shown in FIG. 3), the second secondary speaker representation SR_2_2 may comprise a representation indicating that the first conversation, e.g. the last conversation, has been the best conversation of the day, the best conversation of the week, the best conversation of the month, and/or the best conversation of the year for the second speaker (e.g. a caller and/or agent). In other words, the second secondary speaker representation SR_2_2 may comprise a representation indicating that the first conversation has been the conversation where the second speaker (e.g. caller and/or agent) have had the best performance, e.g. the best conversation score, within a certain period.

For example, when the last conversation has been the best of the day/week/month, the electronic device 10 may then display the second secondary speaker representation SR_2_2 as an animated second secondary user interface object SR_2_2, e.g. comprising fireworks animations, party animations, and/or popping bottle animation. The second secondary speaker representation SR_2_2 may also comprise a text indicating e.g. to the second speaker (e.g. being an agent) that the last conversation was the best conversation of the day/week/month for the second speaker. The second secondary speaker representation SR_2_2 may also comprise a text indicating e.g. to the second speaker (e.g. being an agent) that the last conversation was the best conversation with the first speaker/caller, e.g. that specific first speaker/caller.

The first post-conversation representation PCR_1 comprises a first tertiary speaker representation SR_1_3, e.g. arranged in a first tertiary display region. The electronic device 10 displays the first tertiary speaker representation SR_1_3 as a first tertiary user interface object SR_1_3, e.g. having a first tertiary display region.

The first tertiary speaker representation SR_1_3 is based on the determined first speaker metric data SPMD_1. The first tertiary speaker representation SR_1_3 may be based on the first primary speaker metric data SPMD_1_1, e.g. being sentiment metric data SMD, based on the first secondary speaker metric data SPMD_1_2, e.g. being tone metric data TMD, and/or based on the first tertiary speaker metric data SPMD_1_3, e.g. being appearance metric data AMD.

The first tertiary speaker representation SR_1_3 may be based on sentiment metric data, tone metric data, and/or appearance metric data, such as a determined first primary sentiment metric SM_1_1, a determined first primary tone metric TM_1_1, and/or a determined first primary appearance metric AM_1_1 of a first speaker.

The first tertiary speaker representation SR_1_3 is indicative of a sentiment distribution of the first speaker during the first conversation.

The first tertiary speaker representation SR_1_3 comprises a representation of a sentiment distribution of the first speaker, e.g. during the first conversation. The first tertiary speaker representation SR_1_3 may comprise a representation of a sentiment distribution of one or more first sentiment type identifiers ST_ID_1_i of the first speaker, e.g. one or more first speaker states.

In other words, the first tertiary speaker representation SR_1_3 may comprise a representation indicative of a time duration of the first conversation or a time duration of the first speaker speaking during the first conversation, during which the first speaker have had one or more first sentiment type identifiers ST_ID_1_i. In FIG. 3, the first tertiary speaker representation SR_1_3 comprises representations in the form of bars of the sentiment distribution of the first speaker during the first conversation. Each bar is indicative of a distribution or level of a first sentiment type identifier of the first speaker, e.g. a first speaker state of the first speaker.

A sentiment distribution may for example be, during 86% of the first conversation duration the first speaker have had the first speaker state "very negative". The first bar associated with the first speaker state "very negative" has therefore a size corresponding to the value 86%. During 14% of the first conversation duration the first speaker have had the first speaker state "negative". The second bar associated with the first speaker state "negative" has therefore a size corresponding to the value 14%. During 0% of the first conversation duration the first speaker have had the first speaker state "neutral". The third bar associated with the first speaker state "neutral" has therefore a size corresponding to the value 0%, i.e. the bar being almost non-existent. During 0% of the first conversation duration the first speaker have had the first speaker state "positive". The fourth bar associated with the first speaker state "positive" has therefore a size corresponding to the value 0%, i.e. the bar being almost non-existent.

The first tertiary speaker representation may be based on the first audio signal and the second audio signal. The first tertiary speaker representation may be determined as a comparison between the first audio signal and the second audio signal. The first post-conversation representation may comprise a second tertiary speaker representation SR_2_3 for the second speaker. The second tertiary speaker representation is optionally based on the second audio signal for the second speaker and may be a tertiary speaker representation, e.g. as described in relation to the first tertiary speaker representation. In other words, the description of the first tertiary speaker representation may also apply to the second tertiary speaker representation.

The first post-conversation representation PCR_1 comprises a first quaternary speaker representation SR_1_4, e.g. arranged in a first quaternary display region. The electronic device 10 displays the first quaternary speaker representation SR_1_4 as a first quaternary user interface object SR_1_4, e.g. having a first quaternary display region.

The first quaternary speaker representation SR_1_4 is based on the determined first speaker metric data SPMD_1. The first quaternary speaker representation SR_1_4 may be based on the first primary speaker metric data SPMD_1_1, e.g. being sentiment metric data SMD, based on the first secondary speaker metric data SPMD_1_2, e.g. being tone metric data TMD, and/or based on the first quaternary speaker metric data SPMD_1_3, e.g. being appearance metric data AMD.

The first quaternary speaker representation SR_1_4 may be based on sentiment metric data, tone metric data, and/or appearance metric data, such as a determined first primary sentiment metric SM_1_1, a determined first primary tone metric TM_1_1, and/or a determined first primary appearance metric AM_1_1 of a first speaker.

The first quaternary speaker representation SR_1_4 is indicative of a conversation score, such as call score, of the first speaker, e.g. during the first conversation. The first quaternary speaker representation SR_1_4 comprises a representation of a conversation score, e.g. a mean conversation score, of the first speaker, e.g. during the first conversation. The conversation score may be a score between 0 and 20, 0 and 10, or 0 and 5. The conversation score may comprise one, two, or three digits after the decimal point. In FIG. 3 the conversation score displayed in the first quaternary speaker representation SR_1_4 comprises one digit after the decimal point. The first quaternary speaker representation SR_1_4 comprises a numeric representation of the conversation score or call score, where the displayed conversation score has the number 0.3 out of 10.

The first quaternary speaker representation SR_1_4 may comprise a representation (not shown) indicating that the conversation score, e.g. of the first conversation, e.g. the last conversation, has been the best conversation score of the day, the best conversation score of the week, the best conversation score of the month, and/or the best conversation score of the year for the first speaker. In other words, the first quaternary speaker representation SR_1_4 may comprise a representation indicating that the first conversation has been the conversation where the first speaker have had the best performance, e.g. the best conversation score, within a certain period. The first quaternary speaker representation SR_1_4 may comprise a first quaternary colour based on the one or more speaker metric data. For example, when the conversation score is in a first range, a first colour may be assigned to the first quaternary speaker representation SR_1_4.

The first quaternary speaker representation SR_1_4 may comprise a first quaternary size based on the one or more speaker metric data. For example, when the conversation score is in a first range, a first size may be assigned to the first quaternary speaker representation SR_1_4. The first quaternary speaker representation SR_1_4 may comprise a first quaternary height based on the one or more speaker metric data. For example, when the conversation score is in a first range, a first height may be assigned to the first quaternary speaker representation SR_1_4. In FIG. 3, the digit before the decimal point, e.g. "0" in SR_1_4, has a size larger than the size of the digit after the decimal point, e.g. "3" in SR_1_4.

The first quaternary speaker representation SR_1_4 may comprise a first quaternary animation (not shown) based on the one or more speaker metric data. For example, when the conversation score is the best of the day, a first animation may be assigned to the first quaternary speaker representation SR_1_4.

The first quaternary speaker representation SR_1_4 may be based on the first audio signal and the second audio signal. The first post-conversation representation may comprise a second quaternary speaker representation SR_2_4 for the second speaker. The second quaternary speaker representation is optionally based on the second audio signal for the second speaker and may be a quaternary speaker representation, e.g. as described in relation to the first quaternary speaker representation. In other words, the description of the first quaternary speaker representation may also apply to the second quaternary speaker representation.

The first post-conversation representation PCR_1 may comprise a first quinary speaker representation SR_1_5, e.g. arranged in a first quinary display region. The electronic device 10 displays the first quinary speaker representation SR_1_5 as a first quinary user interface object SR_1_5, e.g. having a first quinary display region. In FIG. 3, the first quinary speaker representation SR_1_5 is a common speaker representation indicative of one or more labels for the first speaker representations and the second speaker representations. The first quinary speaker representation SR_1_5 may provide indications to the user of the electronic device 10 about which representations that are displayed on the display 11. The first quinary speaker representation SR_1_5 comprises a first label for the first quaternary speaker representation SR_1_4 and the second quaternary speaker representation SR_2_4 being "Call Score". The first quinary speaker representation SR_1_5 comprises a second label for the first tertiary speaker representation SR_1_3 and the second tertiary speaker representation SR_2_3 being "Sentiment Distribution". The first quinary speaker representation SR_1_5 comprises a third label for the first secondary speaker representation SR_1_2 and the second secondary speaker representation SR_2_2 being "Last 5 calls".

The speaker representations SR_1_1, SR_2_1 are exemplified in FIG. 3 with representations from "www.iconfinder.com/UsersInsights".

Figure 4:
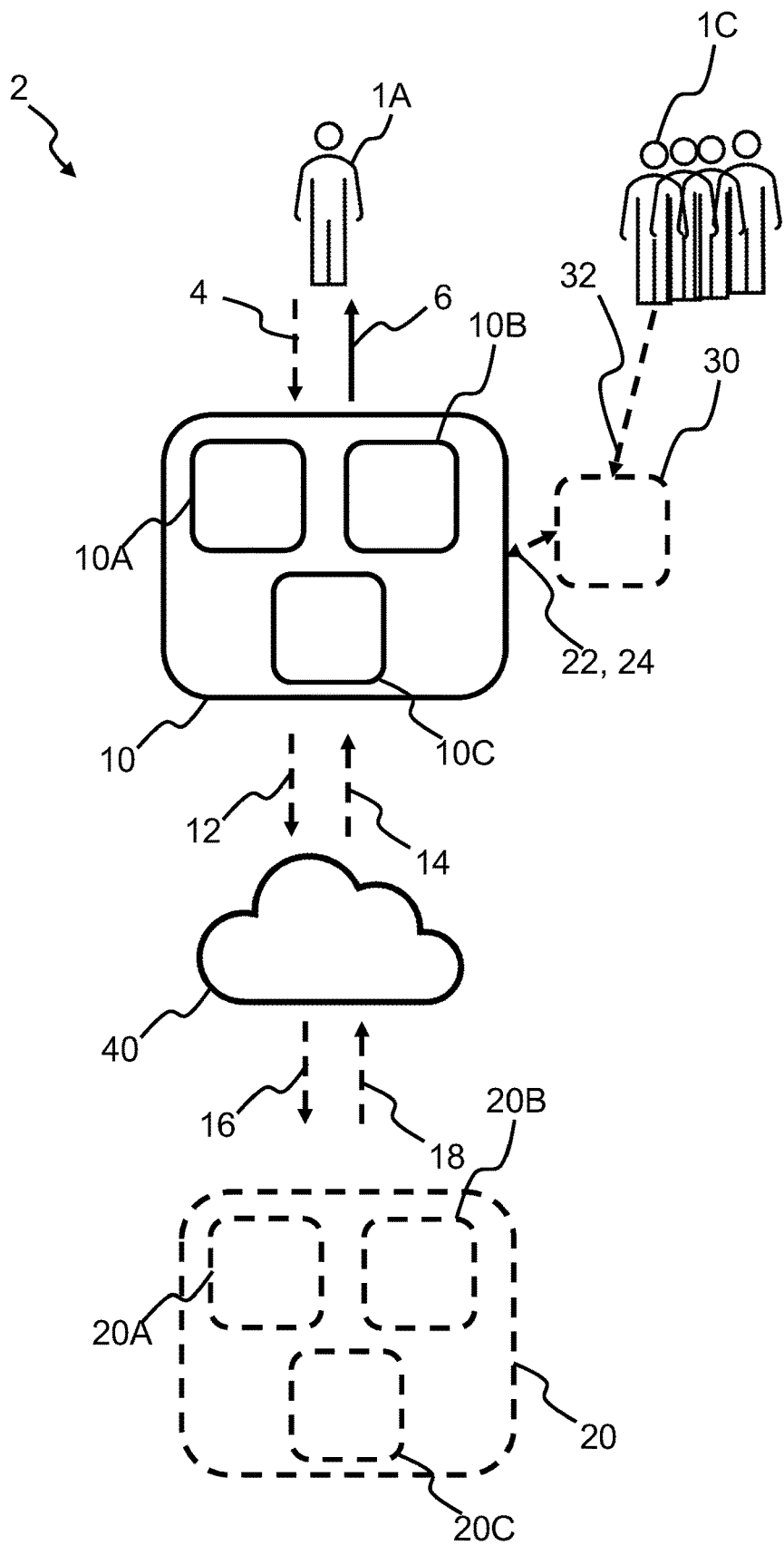

FIG. 4 schematically illustrates an exemplary system, such as system 2, with speaker representation according to the present disclosure. The system 2 is similar to the system shown in FIG. 1, but where the user 1A and a speaker or group of speakers 1C are collocated, e.g. in the same room or the same place. The user 1A and speaker(s) 1C may conduct a meeting, e.g. a conference, a physical meeting or a job interview. The electronic device 10, such as the interface 10B, may comprise or be connected to a microphone via which the user 1A and/or the speaker(s) 1C may speak into to provide an audio input 32.

Optionally, a speaker electronic device 30 may comprise a microphone that the speaker(s) 1C may speak into to provide an audio input 32. The speaker electronic device 30 may be connected locally to the electronic device 10, e.g. via the interface 10B. The connection may be a wire connection or a wireless connection, such as Bluetooth or the like. The speaker electronic device 30 may transmit 22 one or more audio signals, including the first audio signal, to the electronic device 10 via the connection, e.g. the interface 10B. The speaker electronic device 30 may obtain/receive 24 one or more audio signals from the electronic device 10 via the connection.

Figure 5:
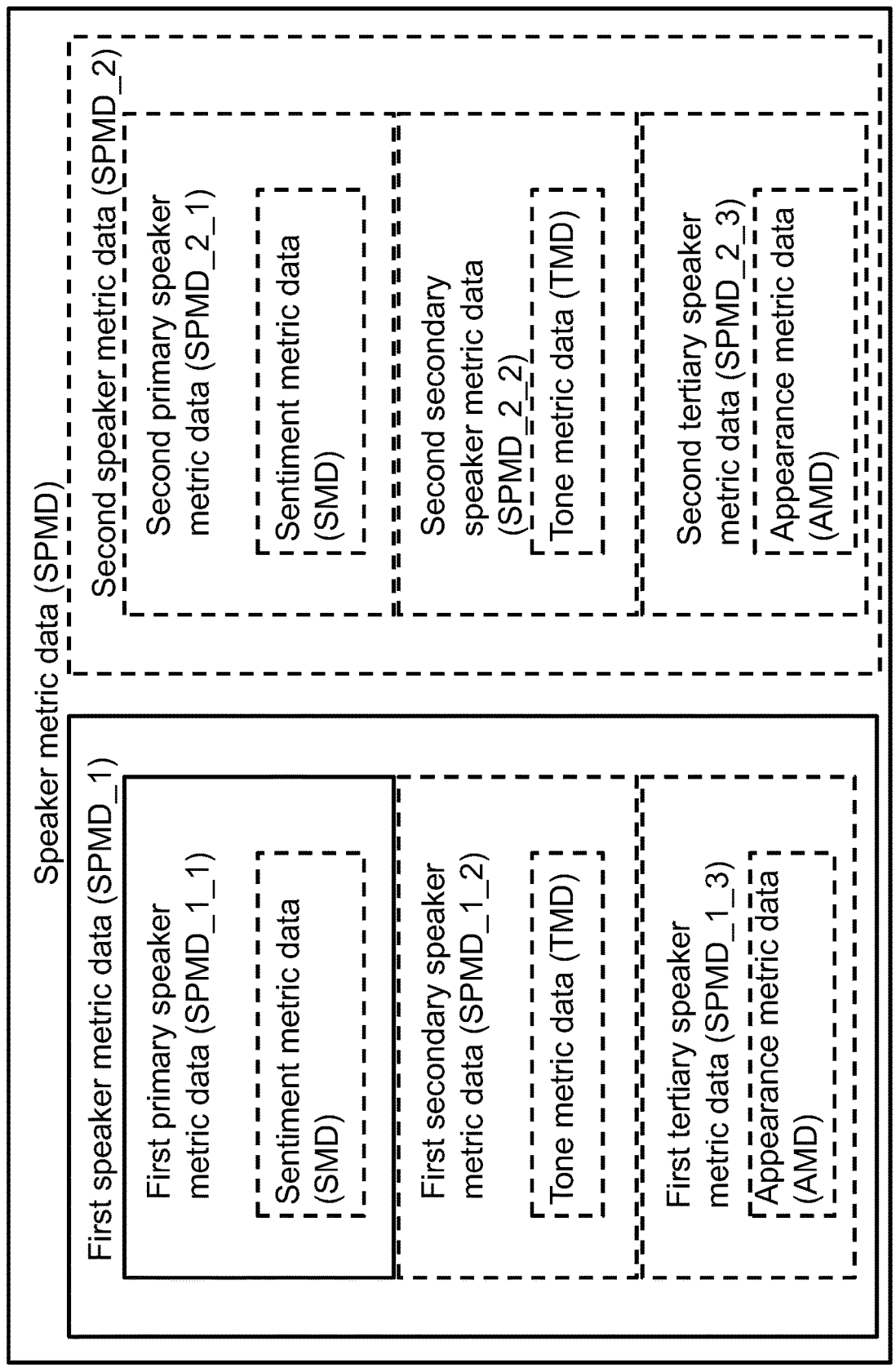

FIG. 5. schematically illustrates an exemplary data structure according to the present disclosure. The speaker metric data SPMD comprises first speaker metric data SPMD_1. The first speaker metric data SPMD_1 comprises first primary speaker metric data SPMD_1_1. The first primary speaker metric data SPMD_1_1_1 optionally comprises sentiment metric data SMD. The first speaker metric data SPMD_1 optionally comprises first secondary speaker metric data SPMD_1_2. The first secondary speaker metric data SPMD_1_2 optionally comprises tone metric data TMD. The first speaker metric data SPMD_1 optionally comprises first tertiary speaker metric data SPMD_1_3. The first tertiary speaker metric data SPMD_1_3 optionally comprises appearance metric data AMD.

The speaker metric data SPMD optionally comprises second speaker metric data SPMD_2. The second speaker metric data SPMD_1 optionally comprises second primary speaker metric data SPMD_2_1. The second primary speaker metric data SPMD_2_1 optionally comprises sentiment metric data SMD. The second speaker metric data SPMD_2 optionally comprises second secondary speaker metric data SPMD_2_2. The second secondary speaker metric data SPMD_2_2 optionally comprises tone metric data TMD. The second speaker metric data SPMD_2 optionally comprises second tertiary speaker metric data SPMD_2_3. The second tertiary speaker metric data SPMD_2_3 optionally comprises appearance metric data AMD.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the one or more audio signals, the one or more sentiment metrics, the one or more appearance metrics, the speaker representations, the sentiment metric data, and/or the appearance metric data) in a part of the memory.

Furthermore, the labelling of a first element does not imply the presence of a second element and vice versa.

It may be appreciated that FIGS. 1-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1A user, second speaker
1B speaker, first speaker, caller
1C speaker(s), group of speakers,
2 system
4 user input
6 speaker representation, user output
10 electronic device
10A memory
10B one or more interfaces
10C processor
11 display
12 transmit
14 obtain
16 obtain
18 transmit
20 server device
20A memory
20B interface
20C one or more processors
22 transmit
24 obtain
30 speaker electronic device
32 speaker input, audio input
40 network
AS audio signal
A_ID appearance identifier
A_ID_1 first appearance identifier
A_ID_1_1 first primary appearance identifier
A_ID_1_2 first secondary appearance identifier
A_ID_1_3 first tertiary appearance identifier
A_ID_2_1 second primary appearance identifier
A_ID_2_2 second secondary appearance identifier
A_ID_2_3 second tertiary appearance identifier
A_ID_SET set of appearance identifiers
A_ID_SET_1 primary set of appearance identifiers
A_ID_SET_2 secondary set of appearance identifiers
ACS appearance confidence score
ACS_1 first appearance confidence score
ACS_1_1 first primary appearance confidence score
ACS_1_2 first secondary appearance confidence score
ACS_2 second appearance confidence score
ACS_2_1 second primary appearance confidence score
AL appearance level
AL_1 first appearance level
AL_1_1 first primary appearance level
AL_1_2 first secondary appearance level
AL_1_3 first tertiary appearance level
AL_2_1 second primary appearance level
AL_2_2 second secondary appearance level
AL_2_3 second tertiary appearance level
AS_1 first audio signal
AS_2 first audio signal
AM appearance metric AM_1 first appearance metric
AM_1_1 first primary appearance metric
AM_1_2 first secondary appearance metric
AM_1_3 first tertiary appearance metric
AM_2_1 secondary primary appearance metric
AM_2_2 second secondary appearance metric
AM_2_3 second tertiary appearance metric
F_1 first feature
F_1_1 first primary feature
F_1_2 first secondary feature
F_2 second feature
F_2_1 second primary feature
F_2_2 second secondary feature
F_ID feature identifier
F_ID_1 feature type identifier
F_ID_1_1 first primary feature identifier
F_ID_1_2 first secondary feature identifier
FL feature level
FL_1_1 first primary feature level
FL_1_2 first secondary feature level
PCR post-conversation representation
PCR_1 first post-conversation representation
SCS confidence score
SCS_1 first confidence score
SCS_1_1 first primary confidence score
SCS_1_2 first secondary confidence score
SCS_2_1 second primary confidence score
SL sentiment level
SL_1_1 first primary sentiment level
SL_1_2 first secondary sentiment level
SL_2_1 second primary sentiment level
SM sentiment metrics
SM_1 first sentiment metric
SM_1_1 first primary sentiment metric
SM_1_2 first secondary sentiment metric
SM_2 second sentiment metric
SM_2_1 second primary sentiment metric
SM_2_2 second secondary sentiment metric
ST_ID_1_1 first primary sentiment type identifier
ST_ID_1_2 first secondary sentiment type identifier
ST_ID_2_1 second primary sentiment type identifier
ST_ID_2_2 second secondary sentiment type identifier
ST_ID_SET_1 primary set of sentiment type identifiers
ST_ID_SET_2 secondary set of sentiment type identifiers
SMD sentiment metric data
SPMD speaker metric data
SPMD_1 first speaker metric data
SPMD_1_1 first primary speaker metric data
SPMD_1_2 first secondary speaker metric data
SPMD_1_3 first tertiary speaker metric data
SPMD_2 second speaker metric data
SPMD_2_1 second primary speaker metric data
SR speaker representation
SR_1 first speaker representation
SR_1_1 first primary speaker representation
SR_1_2 first secondary speaker representation
SR_1_3 first tertiary speaker representation
SR_1_4 first quaternary speaker representation
SR_1_5 first quinary speaker representation
SR_1_6 first senary speaker representation
SR_1_7 first septenary speaker representation
SR_1_8 first octonary speaker representation
SR_2 second speaker representation
SR_2_1 second primary speaker representation
SR_2_2 second secondary speaker representation
SR_2_3 second tertiary speaker representation
SR_2_4 second quaternary speaker representation
SR_2_5 second quinary speaker representation
SR_2_6 second senary speaker representation
SR_2_7 second septenary speaker representation
SR_2_8 second octonary speaker representation
ST_ID sentiment type identifier
ST_ID_1 first sentiment type identifier
ST_ID_1_1 first primary sentiment type identifier
ST_ID_1_2 first secondary sentiment type identifier
ST_ID_SET set of sentiment type identifiers
ST_ID_SET_1 primary set of sentiment type identifiers
ST_ID_SET_2 secondary set of sentiment type identifiers
100 method of operating a system comprising an electronic device
S102 obtaining audio signals
S104 determining speaker metric data
S104A determining first speaker metric data
S104B determining second speaker metric data
S106 detecting termination of conversation
S108 determining post-conversation representation
S108A determining first post-conversation representation
S108B including speaker representation in the first post-conversation representation
S110 outputting post-conversation representation
S110A outputting first post-conversation representation
S112 determining conversation data
S112A determining first conversation data
S114 transmitting conversation data to server
S114A transmitting first conversation data to server
B reiterate, restart

The invention claimed is:

1. A method of operating a system comprising an electronic device, the electronic device comprising an interface, a processor, and a memory, the method comprising:
obtaining one or more audio signals including a first audio signal of a first conversation;
determining first speaker metric data of a first speaker based on the first audio signal, the first speaker metric data including first primary speaker metric data, characterized in that the first primary metric data is sentiment metric data;
detecting a termination of the first conversation;
in accordance with detecting the termination of the first conversation, determining a first post-conversation representation based on the first speaker metric data; and
outputting, via the interface of the electronic device, the first post-conversation representation, wherein outputting the first post-conversation representation comprises displaying a first user interface indicative of the first post-conversion representation after the termination of the first conversation.

2. Method according to claim 1, wherein determining a first post-conversation representation comprises determining a first primary speaker representation based on the first primary speaker metric data and including the first primary speaker representation in the first post-conversation representation.

3. Method according to claim 2, wherein the first primary speaker representation comprises a first avatar based on the first primary speaker metric data.

4. Method according to claim 1, wherein the first speaker metric data comprises first secondary speaker metric data, and wherein the method comprises determining a first secondary speaker representation based on the first speaker metric data and including the first secondary speaker representation in the first post-conversation representation.

5. Method according to claim 4, wherein the first secondary speaker representation is based on historic first speaker metric data.

6. Method according to claim 4, wherein the first secondary speaker metric data is tone metric data.

7. Method according to claim 1, wherein determining a first post-conversation representation comprises determining a first tertiary speaker representation based on first speaker metric data and including the first tertiary speaker representation in the first post-conversation representation.

8. Method according to claim 7, wherein the first tertiary speaker representation is indicative of a sentiment distribution of the first speaker during the first conversation.

9. Method according to claim 1, wherein determining a first post-conversation representation comprises determining a first quaternary speaker representation based on first speaker metric data and including the first quaternary speaker representation in the first post-conversation representation.

10. Method according to claim 3, wherein the first speaker metric data comprises first tertiary speaker metric data being appearance metric data, and wherein the first primary speaker representation is based on the first tertiary speaker metric data.

11. Method according to claim 1, the one or more audio signals comprising a second audio signal, wherein the method comprises determining second speaker metric data of a second speaker based on the second audio signal, the second speaker metric data including second primary speaker metric data, and wherein the first post-conversation representation is based on the second speaker metric data.

12. Method according to claim 11, wherein determining the first post-conversation representation comprises determining a second primary speaker representation based on the second speaker metric data and including the second primary speaker representation in the first post-conversation representation.

13. Method according to claim 12, wherein the second primary speaker metric data is sentiment metric data, and wherein the second primary speaker representation comprises a second avatar based on the second primary speaker metric data.

14. Method according to claim 1, wherein the method comprises, in accordance with detecting the termination of the first conversation, determining first conversation data based on the first speaker metric data and transmitting the first conversation data to the server device.

15. Electronic device comprising a processor, a memory, and an interface, wherein the processor is configured to:
obtain one or more audio signals including a first audio signal during a first conversation;
determine first speaker metric data of a first speaker based on the first audio signal, the first speaker metric data including first primary speaker metric data, characterized in that the first primary speaker metric data is sentiment metric data;
detect a termination of the first conversation, and
in accordance with a detection of the termination of the first conversation, determine a first post-conversation representation based on the first speaker metric data; and
output, via the interface, the first post-conversation representation, wherein to output the first post-conversation representation comprises to display a first user interface indicative of the first post-conversion representation after the termination of the first conversation.

16. System comprising:
a server device; and
an electronic device in communication with the server device, the electronic device comprising a processor, a memory, and an interface, wherein the processor is configured to:
obtain one or more audio signals including a first audio signal during a first conversation;
determine first speaker metric data of a first speaker based on the first audio signal, the first speaker metric data including first primary speaker metric data, characterized in that the first primary speaker metric data is sentiment metric data;
detect a termination of the first conversation, and
in accordance with a detection of the termination of the first conversation, determine a first post-conversation representation based on the first speaker metric data; and
output, via the interface, the first post-conversation representation, wherein to output the first post-conversation representation comprises to display a first user interface indicative of the first post-conversion representation after the termination of the first conversation.

* * * * *